(12) United States Patent
Feder et al.

(10) Patent No.: US 10,931,897 B2
(45) Date of Patent: Feb. 23, 2021

(54) SYSTEMS AND METHODS FOR A DIGITAL IMAGE SENSOR

(71) Applicant: Duelight LLC, Sunnyvale, CA (US)

(72) Inventors: Adam Barry Feder, Mountain View, CA (US); William Guie Rivard, Menlo Park, CA (US); Brian J. Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/684,389

(22) Filed: Nov. 14, 2019

(65) Prior Publication Data

US 2020/0084398 A1 Mar. 12, 2020

Related U.S. Application Data

(63) Continuation of application No. 16/217,848, filed on Dec. 12, 2018, now Pat. No. 10,498,982, which is a
(Continued)

(51) Int. Cl.
*H04N 5/355* (2011.01)
*H04N 5/235* (2006.01)
(Continued)

(52) U.S. Cl.
CPC ....... *H04N 5/35554* (2013.01); *H04N 5/2256* (2013.01); *H04N 5/2355* (2013.01);
(Continued)

(58) Field of Classification Search
CPC ............ H04N 5/35554; H04N 5/3745; H04N 5/37452; H04N 5/2355; H04N 5/265;
(Continued)

(56) References Cited

U.S. PATENT DOCUMENTS 4,873,561 A 10/1989 Wen
5,200,828 A 4/1993 Jang et al.
(Continued)

FOREIGN PATENT DOCUMENTS

CN 101290388 A 10/2008
CN 101408709 A 4/2009
(Continued)

OTHER PUBLICATIONS

Office Action from Japanese Patent Application No. 2017-544281, dated Nov. 26, 2019.
(Continued)

*Primary Examiner* — Mekonnen D Dagnew
(74) *Attorney, Agent, or Firm* — Zilka-Kotab, P.C.

(57) ABSTRACT

A system, method, and computer program product are provided for generating an image stack. In use, one or more exposure parameters for an image stack are configured. Next, a capture command is received. Further, a pixel array is initialized within an image sensor of the camera module. Moreover, one or more ambient images are sampled within one or more corresponding analog storage planes. Next, if it is determined whether a strobe unit is enabled, where, if it is determined that the strobe unit is enabled, one or more strobe images are sampled within the corresponding analog storage planes.

20 Claims, 21 Drawing Sheets

Related U.S. Application Data continuation of application No. 15/814,238, filed on Nov. 15, 2017, now Pat. No. 10,182,197, which is a continuation of application No. 15/354,935, filed on Nov. 17, 2016, now Pat. No. 9,860,461, which is a continuation of application No. 13/999,678, filed on Mar. 14, 2014, now Pat. No. 9,807,322.

(60) Provisional application No. 61/852,427, filed on Mar. 15, 2013.

(51) Int. Cl.
| | |
|---|---|
| *H04N 5/3745* | (2011.01) |
| *H04N 5/262* | (2006.01) |
| *H04N 5/265* | (2006.01) |
| *H04N 5/225* | (2006.01) |
| *H04N 5/378* | (2011.01) |

(52) U.S. Cl.
CPC ............ *H04N 5/265* (2013.01); *H04N 5/2621* (2013.01); *H04N 5/2624* (2013.01); *H04N 5/378* (2013.01); *H04N 5/3745* (2013.01); *H04N 5/37452* (2013.01); *H04N 5/37455* (2013.01)

(58) Field of Classification Search
CPC .... H04N 5/2256; H04N 5/378; H04N 5/2621; H04N 5/2624; H04N 5/37455
See application file for complete search history.

(56) References Cited

U.S. PATENT DOCUMENTS

| | | |
|---|---|---|
| 5,363,209 A | 11/1994 | Eschbach et al. |
| 5,818,977 A | 10/1998 | Tansley |
| 5,867,215 A | 2/1999 | Kaplan |
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B1 | 12/2013 | Nayar et al. |
| 8,675,086 B1 | 3/2014 | Linzer |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang et al. |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 10,785,401 B2 | 9/2020 | Rivard et al. |
| 2003/0015645 A1 | 1/2003 | Brickell et al. |
| 2003/0142745 A1 | 7/2003 | Osawa |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0088570 A1 | 4/2005 | Seo |
| 2005/0134723 A1 | 6/2005 | Lee et al. |
| 2006/0015308 A1 | 1/2006 | Marschner et al. |
| 2006/0050165 A1 | 3/2006 | Amano |
| 2006/0087702 A1 | 4/2006 | Satoh et al. |
| 2006/0181614 A1 | 8/2006 | Yen et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1 | 6/2008 | Chen et al. |
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0160992 A1 | 6/2009 | Inaba et al. |
| 2009/0175555 A1 | 7/2009 | Mahowald |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1* | 8/2010 | Terashima ............ G11B 27/105 348/333.11 |
| 2010/0201831 A1 | 8/2010 | Weinstein |

(56) References Cited

U.S. PATENT DOCUMENTS

| | | |
|---|---|---|
| 2010/0208099 A1 | 8/2010 | Nomura |
| 2010/0231747 A1 | 9/2010 | Yim |
| 2010/0265079 A1 | 10/2010 | Yin |
| 2010/0302407 A1 | 12/2010 | Ayers et al. |
| 2011/0019051 A1 | 1/2011 | Yin et al. |
| 2011/0090385 A1 | 4/2011 | Aoyama et al. |
| 2011/0096192 A1 | 4/2011 | Niikura |
| 2011/0115971 A1 | 5/2011 | Furuya et al. |
| 2011/0134267 A1 | 6/2011 | Ohya |
| 2011/0150332 A1 | 6/2011 | Sibiryakov et al. |
| 2011/0194618 A1 | 8/2011 | Gish et al. |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1 | 3/2012 | Yano |
| 2012/0069213 A1 | 3/2012 | Jannard et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0242844 A1 | 9/2012 | Walker et al. |
| 2012/0262600 A1 | 10/2012 | Velarde et al. |
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0021447 A1 | 1/2013 | Brisedoux et al. |
| 2013/0027580 A1 | 1/2013 | Olsen et al. |
| 2013/0050520 A1 | 2/2013 | Takeuchi |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0147979 A1* | 6/2013 | McMahon ............ H04N 5/335 348/218.1 |
| 2013/0148013 A1 | 6/2013 | Shiohara |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0009636 A1 | 1/2014 | Lee et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0168468 A1 | 6/2014 | Levoy et al. |
| 2014/0176757 A1 | 6/2014 | Rivard et al. |
| 2014/0184894 A1 | 7/2014 | Motta |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0354781 A1 | 12/2014 | Matsuyama |
| 2015/0005637 A1 | 1/2015 | Stegman et al. |
| 2015/0077581 A1 | 3/2015 | Baltz et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0138366 A1 | 5/2015 | Keelan et al. |
| 2015/0222809 A1 | 8/2015 | Osuka et al. |
| 2015/0229819 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2016/0028948 A1 | 1/2016 | Omori et al. |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0323518 A1 | 11/2016 | Rivard et al. |
| 2016/0381304 A9 | 12/2016 | Feder et al. |
| 2017/0048442 A1 | 2/2017 | Cote et al. |
| 2017/0054966 A1 | 2/2017 | Zhou et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0302903 A1 | 10/2017 | Ng et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0116306 A1 | 4/2019 | Rivard et al. |
| 2019/0124280 A1 | 4/2019 | Feder et al. |
| 2019/0174028 A1 | 6/2019 | Rivard et al. |
| 2019/0197297 A1 | 6/2019 | Rivard et al. |
| 2019/0335151 A1 | 10/2019 | Rivard et al. |
| 2019/0349510 A1 | 11/2019 | Rivard et al. |
| 2020/0029008 A1 | 1/2020 | Rivard et al. |
| 2020/0059575 A1 | 2/2020 | Rivard et al. |
| 2020/0193144 A1 | 6/2020 | Rivard et al. |
| 2020/0259991 A1 | 8/2020 | Rivard et al. |

FOREIGN PATENT DOCUMENTS

| | | |
|---|---|---|
| CN | 102053453 A | 5/2011 |
| CN | 103152519 A | 6/2013 |
| CN | 103813098 A | 5/2014 |
| CN | 204316606 U | 5/2015 |
| CN | 105026955 A | 11/2015 |
| DE | 102011107844 A1 | 1/2013 |
| EP | 2169946 A2 | 3/2010 |
| EP | 2346079 A1 | 7/2011 |
| EP | 2565843 A2 | 3/2013 |
| EP | 2731326 A2 | 5/2014 |
| GB | 2486878 A | 7/2012 |
| GB | 2487943 A | 8/2012 |
| JP | 2000278532 A | 10/2000 |
| JP | 2002112008 A | 4/2002 |
| JP | 2003101886 A | 4/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2007035028 A | 2/2007 |
| JP | 2008236726 A | 10/2008 |

(56) References Cited

FOREIGN PATENT DOCUMENTS

| | | | |
|---|---|---|---|
| JP | 2009267923 A | 11/2009 | |
| JP | 2009303010 A | 12/2009 | |
| JP | 2010016416 A | 1/2010 | |
| JP | 2010136224 A | 6/2010 | |
| JP | 2010157925 A | 7/2010 | |
| JP | 2010166281 A | 7/2010 | |
| JP | 2010239317 A | 10/2010 | |
| JP | 4649623 B2 | 3/2011 | |
| JP | 2011097141 A | 5/2011 | |
| JP | 2011101180 A | 5/2011 | |
| JP | 2011120094 A | 6/2011 | |
| JP | 2011146957 A | 7/2011 | |
| JP | 2012156885 A | 8/2012 | |
| JP | 2012195660 A | 10/2012 | |
| JP | 2013066142 A | 4/2013 | |
| JP | 2013120254 A | 6/2013 | |
| JP | 2013207327 A | 10/2013 | |
| JP | 2013219708 A | 10/2013 | |
| JP | 2013258444 A | 12/2013 | |
| JP | 2013258510 A | 12/2013 | |
| JP | 2014057256 A | 3/2014 | |
| JP | 2014140247 A | 7/2014 | |
| JP | 2014142836 A | 8/2014 | |
| JP | 2014155033 A | 8/2014 | |
| KR | 20100094200 A | 8/2010 | |
| WO | 9746001 A1 | 12/1997 | |
| WO | 0237830 A2 | 5/2002 | |
| WO | 2004064391 A1 | 7/2004 | |
| WO | 2008010559 A1 | 1/2008 | |
| WO | 2009074938 A2 | 6/2009 | |
| WO | 2014172059 A2 | 10/2014 | |
| WO | 2015123455 A1 | 8/2015 | |
| WO | 2015173565 A1 | 11/2015 | |

OTHER PUBLICATIONS

Extended European Search Report from European Application No. 16915389.7, dated Dec. 2, 2019.
Office Action from Japanese Patent Application No. 2017-544284, dated Dec. 10, 2019.
Supplemental Notice of Allowance from U.S. Appl. No. 16/213,041, dated Jun. 17, 2020.
Non-Final Office Action for U.S. Appl. No. 16/857,016, dated Aug. 5, 2020.
Rivard, W. et al., U.S. Appl. No. 17/000,098, filed Aug. 21, 2020.
Office Action from Japanese Patent Application No. 2017-544284, dated Aug. 18, 2020.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.
Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.

(56) References Cited

OTHER PUBLICATIONS

International Preliminary Examination Report from PCT Application No. PCT/US2017/39946, dated Jan. 10, 2019.
Notice of Allowance from U.S. Appl. No. 13/573,252, dated Oct. 22, 2014.
Non-Final Office Action from U.S. Appl. No. 13/573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, filed Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.
International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.
Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Rivard et al., U.S. Appl. No. 16/796,497, filed Feb. 20, 2020.
Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
International Search Report and Written Opinion from International Application No. PCT/US18/54014, dated Dec. 26, 2018.
Non-Final Office Action from U.S. Appl. No. 16/215,351, dated Jan. 24, 2019.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
Rivard et al., U.S. Appl. No. 15/976,756, filed May 10, 2018.
Final Office Action for U.S. Appl. No. 15/636,324, dated Mar. 22, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.

(56) References Cited

OTHER PUBLICATIONS

Office Action from Chinese Patent Application No. 201580079444.1, dated Aug. 1, 2019.
Corrected Notice of Allowance from U.S. Appl. No. 15/636,324, dated Sep. 5, 2019.
Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Rivard et al., U.S. Appl. No. 16/584,486, filed Sep. 26, 2019.
Notice of Allowance from U.S. Appl. No. 15/976,756, dated Oct. 4, 2019.
Notice of Allowance from U.S. Appl. No. 16/290,763, dated Oct. 10, 2019.
Corrected Notice of Allowance from U.S. Appl. No. 16/217,848, dated Oct. 31, 2019.
Non-Final Office Action for U.S. Appl. No. 16/213,041, dated Oct. 30, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Rivard et al., U.S. Appl. No. 16/662,965, filed Oct. 24, 2019.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Office Action from Chinese Patent Application No. 201780053926.9, dated Jan. 16, 2020.
Notice of Allowance from U.S. Appl. No. 16/505,278, dated Sep. 25, 2020.
Supplemental Notice of Allowance from U.S. Appl. No. 16/213,041, dated Aug. 31, 2020.
Summons to Attend Oral Proceedings from European Application No. 15 856 710.7, dated Sep. 18, 2020.
Corrected Notice of Allowance from U.S. Appl. No. 16/519,244, dated Apr. 9, 2020.
Rivard et al., U.S. Appl. No. 16/857,016, filed Apr. 23, 2020.
International Preliminary Examination Report from PCT Application No. PCT/US2018/054014, dated Apr. 16, 2020.
Office Action from Chinese Patent Application No. 201680088945.0, dated May 21, 2020.
Notice of Allowance from U.S. Appl. No. 16/213,041, dated May 29, 2020.
Notice of Allowance from U.S. Appl. No. 16/584,486, dated Oct. 21, 2020.
Corrected Notice of Allowance from U.S. Appl. No. 16/505,278, dated Oct. 22, 2020.
Office Action from Japanese Patent Application No. 2017-544281, dated Oct. 27, 2020.
Office Action from Chinese Patent Application No. 201780053926.9, dated Oct. 13, 2020.
Corrected Notice of Allowance from U.S. Appl. No. 16/584,486, dated Nov. 18, 2020.
Corrected Notice of Allowance from U.S. Appl. No. 16/505,278, dated Nov. 18, 2020.

* cited by examiner

SYSTEMS AND METHODS FOR A DIGITAL IMAGE SENSOR

CROSS-REFERENCES TO RELATED APPLICATIONS

The present application is a continuation of and claims priority to U.S. patent application Ser. No. 16/217,848, titled "SYSTEMS AND METHODS FOR DIGITAL IMAGE SENSOR," filed Dec. 12, 2018, which in is a continuation of and claims priority to U.S. patent application Ser. No. 15/814,238, titled "SYSTEMS AND METHODS FOR DIGITAL IMAGE SENSOR," filed Nov. 15, 2017, which in turn is a continuation of and claims priority to U.S. patent application Ser. No. 15/354,935, now U.S. Pat. No. 9,860,461 titled "SYSTEMS AND METHODS FOR DIGITAL IMAGE SENSOR," filed Nov. 17, 2016, which in turn is a continuation of and claims priority to U.S. patent application Ser. No. 13/999,678, now U.S. Pat. No. 9,807,322, titled "SYSTEMS AND METHODS FOR A DIGITAL IMAGE SENSOR," filed Mar. 14, 2014, which in turn claims priority to U.S. Provisional Application No. 61/852,427, titled "DIGITAL IMAGE SENSOR," filed Mar. 15, 2013, the entire contents of all of which are hereby incorporated by references for all purposes.

FIELD OF THE INVENTION

Embodiments of the present invention relate generally to digital photographic systems, and more specifically to systems and methods for a digital image sensor.

BACKGROUND

A typical digital camera focuses an optical image of a scene onto an image sensor, which samples the optical image to generate an electronic representation of the scene. The electronic representation is then processed and stored as a digital photograph. A conventional image sensor is configured to generate a two-dimensional array of color pixels from the optical image. Each color pixel typically includes an independent intensity value for standard red, green, and blue wavelengths. A properly generated digital photograph will have a natural appearance, resembling direct observation of the scene by a human observer. To generate digital photographs having a natural appearance, digital cameras attempt to mimic certain aspects of human visual perception.

One aspect of human visual perception that digital cameras mimic is dynamic adjustment to scene intensity. The human eye is able to adjust to a wide range of light intensity in the same scene. Digital cameras dynamically adjust to scene intensity by selecting a shutter speed, sampling sensitivity ("ISO" sensitivity associated with sensor sensitivity), and aperture to yield a good overall exposure level when generating the digital photograph. However, for a given exposure setting, a typical scene may include areas spanning a dynamic range that exceeds the dynamic range of a conventional image sensor, leading to overexposure, underexposure, or a combination of both in the same scene. The scene may also include important visual detail at intensities that are poorly quantized by the image sensor when configured for a specific exposure level, leading to quantization error, which appears as "banding" or unwanted "posterization."

Techniques known in the art as high dynamic range (HDR) photography provide for sampling and representing image information having a high dynamic range substantially representative of dynamic range within a given scene. HDR photography conventionally involves sampling a set of digital photographs, referred to as an image stack, at different exposure levels for the same scene to capture image detail at different dynamic range levels. Images comprising an image stack may be combined to synthesize a single digital photograph that represents contrast and image detail depicting the full dynamic range of the scene. In certain scenarios, the full dynamic range is mapped to a reduced dynamic range for display on a conventional display device, such as a liquid crystal display (LCD). The digital photographs comprising the image stack are assumed to contain substantially consistent content that is sampled at different exposures. The digital photographs are conventionally sampled sequentially, with an inter-sample time separating the capture of each digital photograph.

During sequential sampling, the digital camera may move, such as from hand motion or vibration. During sequential sampling, the scene may also change, such as from people, animals, or objects moving in the scene. As a consequence of such motion or change, each digital photograph within the set of digital photographs needs to be aligned to the other digital photographs to provide spatial consistency prior to a combination operation. As inter-sample time increases, the likelihood of uncorrectable misalignment among the digital photographs increases, as does the likelihood of uncorrectable divergent content within the digital photographs. Examples of divergent content include birds flying in a landscape scene, and people talking or otherwise moving in a social scene. A common example of uncorrectable divergent content arises when a person is moving their head, such that the first digital photograph in the set of digital photographs captures the person's face, while a second digital photograph captures the side of the person's head. Conventional alignment techniques are computationally intense and still cannot adequately correct for content changes, such as aligning a face with the side of a head. Furthermore, conventional image capture techniques typically require significant inter-sample time, which may be greater than a thirtieth of one second. Significant inter-sample time commonly leads to capturing uncorrectable divergent content or digital photographs that cannot be properly aligned within the image stack, thereby visibly and negatively impacting the quality of synthetic digital photographs generated from the image stack.

As the foregoing illustrates, there is a need for addressing this and/or other related issues associated with the prior art.

SUMMARY

A system, method, and computer program product are provided for generating an image stack. In use, one or more exposure parameters for an image stack are configured. Next, a capture command is received. Further, a pixel array is initialized within an image sensor of the camera module. Moreover, one or more ambient images are sampled within one or more corresponding analog storage planes. Next, it is determined whether a strobe unit is enabled, where, if it is determined that the strobe unit is enabled, one or more strobe images are sampled within the corresponding analog storage planes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
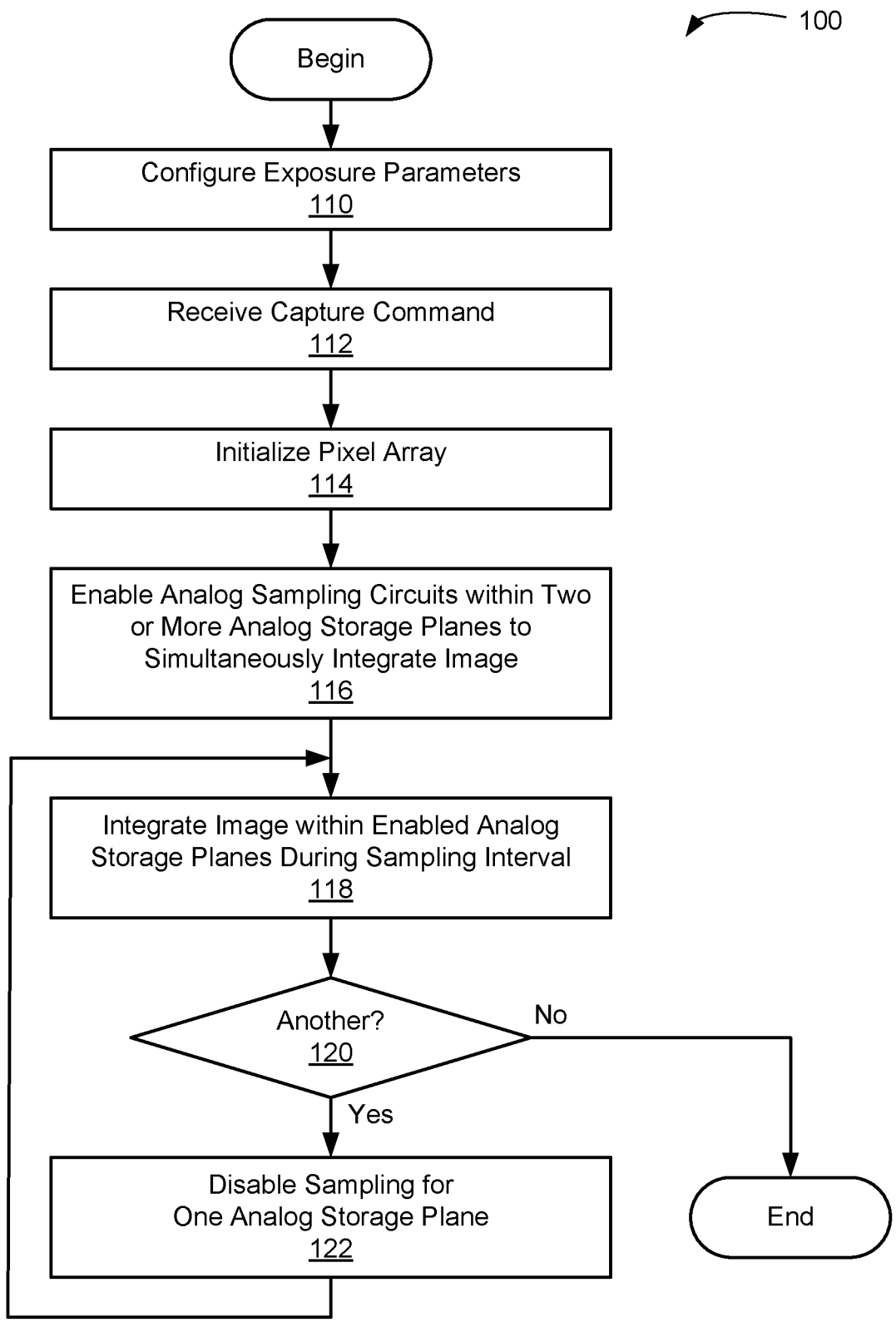
FIG. 1A illustrates a flow chart of a method for generating an image stack comprising two or more images of a photographic scene, in accordance with one embodiment.

Embodiments of the present invention enable a digital photographic system to capture an image stack for a photographic scene. Exemplary digital photographic systems include, without limitation, digital cameras and mobile devices such as smart phones that are configured to include a digital camera module. A given photographic scene is a portion of an overall scene sampled by the digital photographic system. Two or more images are sampled by the digital photographic system to generate an image stack.

A given image stack comprises images of the photographic scene sampled with potentially different exposure, different strobe illumination, or a combination thereof. For example, each image within the image stack may be sampled according to a different exposure time, exposure sensitivity, or a combination thereof. A given image within the image stack may be sampled in conjunction with or without strobe illumination added to the photographic scene. Images comprising an image stack should be sampled over an appropriately short span of time to reduce visible differences or changes in scene content among the images. In one embodiment, images comprising a complete image stack are sampled within one second. In another embodiment, images comprising a complete image stack are sampled within a tenth of a second.

In one embodiment, two or more images are captured according to different exposure levels during overlapping time intervals, thereby reducing potential changes in scene content among the two or more images. In other embodiments, the two or more images are sampled sequentially under control of an image sensor circuit to reduce inter-image time. In certain embodiments, at least one image of the two or more images is sampled in conjunction with a strobe unit being enabled to illuminate a photographic scene. Image sampling may be controlled by the image sensor circuit to reduce inter-image time between an image sampled using only ambient illumination and an image sampled in conjunction with strobe illumination. The strobe unit may comprise a light-emitting diode (LED) configured to illuminate the photographic scene.

In one embodiment, each pixel of an image sensor comprises a set of photo-sensitive cells, each having specific color sensitivity. For example, a pixel may include a photo-sensitive cell configured to be sensitive to red light, a photo-sensitive cell configured to be sensitive to blue light, and two photo-sensitive cells configured to be sensitive to green light. Each photo-sensitive cell is configured to include two or more analog sampling circuits. A set of analog sampling circuits comprising one analog sampling circuit per photo-sensitive cell within the image sensor may be configured to sample and store a first image. Collectively, one set of analog sampling circuits forms a complete image plane and is referred to herein as an analog storage plane. A second set of substantially identically defined analog sampling circuits within the image sensor may be configured to sample and store a second image. A third set of substantially identically defined storage elements within the image sensor may be configured to sample and store a third image, and so forth. Hence an image sensor may be configured to sample and simultaneously store multiple images within analog storage planes.

Each analog sampling circuit may be independently coupled to a photodiode within the photo-sensitive cell, and independently read. In one embodiment, the first set of analog sampling circuits are coupled to corresponding photodiodes for a first time interval to sample a first image having a first corresponding exposure time. A second set of analog sampling circuits are coupled to the corresponding photodiodes for a second time interval to sample a second image having a second corresponding exposure time. In certain embodiments, the first time duration overlaps the second time duration, so that the first set of analog sampling circuits and the second set of analog sampling circuits are coupled to the photodiode concurrently during an overlap time. In one embodiment, the overlap time is within the first time duration. Current generated by the photodiode is split over the number of analog sampling circuits coupled to the photodiode at any given time. Consequently, exposure sensitivity varies as a function how many analog sampling circuits are coupled to the photodiode at any given time and how much capacitance is associated with each analog sampling circuit. Such variation needs to be accounted for in determining exposure time for each image.

FIG. 1A illustrates a flow chart of a method 100 for generating an image stack comprising two or more images of a photographic scene, in accordance with one embodiment. Although method 100 is described in conjunction with the systems of FIGS. 2A-3B, persons of ordinary skill in the art will understand that any system that performs method 100 is within the scope and spirit of embodiments of the present invention. In one embodiment, a digital photographic system, such as digital photographic system 300 of FIG. 3A, is configured to perform method 100. The digital photographic system may be implemented within a digital camera, such as digital camera 202 of FIG. 2A, or a mobile device, such as mobile device 204 of FIG. 2B. In certain embodiments, a camera module, such as camera module 330 of FIG. 3C, is configured to perform method 100. Method 100 may be performed with or without a strobe unit, such as strobe unit 336, enabled to contribute illumination to the photographic scene.

Method 100 begins in step 110, where the camera module configures exposure parameters for an image stack to be sampled by the camera module. Configuring the exposure parameters may include, without limitation, writing registers within an image sensor comprising the camera module that specify exposure time for each participating analog storage plane, exposure sensitivity for one or more analog storage planes, or a combination thereof. Exposure parameters may be determined prior to this step according to any technically feasible technique, such as well-known techniques for estimating exposure based on measuring exposure associated with a sequence of test images sampled using different exposure parameters.

In step 112, the camera module receives a capture command. The capture command directs the camera module to sample two or more images comprising the image stack. The capture command may result from a user pressing a shutter release button, such as a physical button or a user interface button. In step 114, the camera module initializes a pixel array within the image sensor. In one embodiment, initializing the pixel array comprises driving voltages on internal nodes of photo-sensitive cells within one or more analog storage planes to a reference voltage, such as a supply voltage or a bias voltage. In step 116, the camera module enables analog sampling circuits within two or more analog storage planes to simultaneously integrate (accumulate) an image corresponding to a photographic scene. In one embodiment, integrating an image comprises each analog sampling circuit within an analog storage plane integrating a current generated by a corresponding photodiode. In step 118, analog sampling circuits within enabled analog storage planes integrate a respective image during a sampling interval. Each sampling interval may comprise a different time duration.

If, in step 120, the camera module should sample another image, then the method proceeds to step 122, where the camera module disables sampling for one analog storage plane within the image sensor. Upon disabling sampling for a given analog storage plane, an image associated with the analog storage plane has been sampled completely for an appropriate exposure time.

Returning to step 120, if the camera module should not sample another image then the method terminates. The camera module should not sample another image after the last sampling interval has lapsed and sampling of the last image has been completed.

Reading an image from a corresponding analog storage plane may proceed using any technically feasible technique.

Figure 1B:
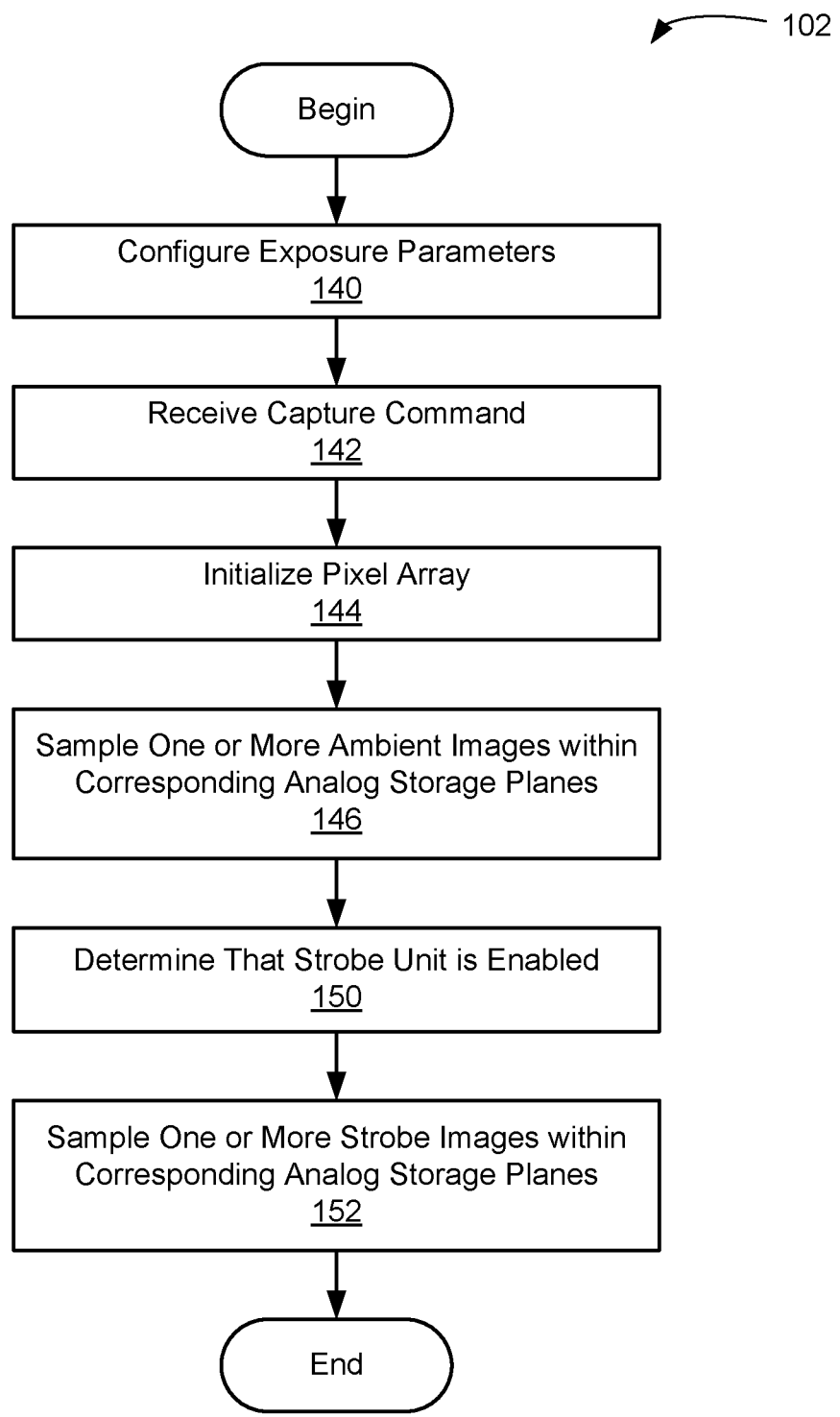
FIG. 1B illustrates a flow chart of a method for generating an image stack comprising an ambient image and a strobe image of a photographic scene, in accordance with one embodiment.

FIG. 1B illustrates a flow chart of a method 102 for generating an image stack comprising an ambient image and a strobe image of a photographic scene, in accordance with one embodiment. Although method 102 is described in conjunction with the systems of FIGS. 2A-3B, persons of ordinary skill in the art will understand that any system that performs method 102 is within the scope and spirit of embodiments of the present invention. In one embodiment, a digital photographic system, such as digital photographic system 300 of FIG. 3A, is configured to perform method 102. The digital photographic system may be implemented within a digital camera, such as digital camera 202 of FIG. 2A, or a mobile device, such as mobile device 204 of FIG. 2B.

Method 102 begins in step 140, where the camera module configures exposure parameters for an image stack to be sampled by the camera module. Configuring the exposure parameters may include, without limitation, writing registers within an image sensor comprising the camera module that specify exposure time for each participating analog storage plane, exposure sensitivity for one or more analog storage planes, or a combination thereof. Exposure parameters may be determined prior to this step according to any technically feasible technique, such as well-known techniques for estimating exposure based on measuring exposure associated with a sequence of test images sampled using different exposure parameters.

In step 142, the camera module receives a capture command. The capture command directs the camera module to sample two or more images comprising the image stack. The capture command may result from a user pressing a shutter release button, such as a physical button or a user interface button. In step 144, the camera module initializes a pixel array within the image sensor. In one embodiment, initializing the pixel array comprises driving voltages on internal nodes of photo-sensitive cells within one or more analog storage planes to a reference voltage, such as a supply voltage or a bias voltage.

In step 146, the camera module samples one or more ambient images within corresponding analog storage planes. In one embodiment, step 146 implements steps 116 through 122 of method 100 of FIG. 1A.

In step 150, the camera module determines that a strobe unit, such as strobe unit 336 of FIG. 3C, is enabled. In one embodiment, determining that the strobe unit is enabled includes the camera module directly enabling the strobe unit, such by transmitting a strobe control command through strobe control signal 338. In another embodiment, determining that the strobe unit is enabled includes the camera module detecting that the strobe unit has been enabled, such as by processor complex 310.

In step 152, the camera module samples one or more strobe images within corresponding analog storage planes. In one embodiment, step 152 implements steps 116 through 122 of method 100 of FIG. 1A. In one embodiment, the camera module directly disables the strobe unit after completing step 152, such as by transmitting a strobe control command through strobe control signal 338. In another embodiment, processor complex 310 disables the strobe unit after the camera module completes step 152.

In certain embodiments, the camera module is configured to store both ambient images and strobe images concurrently within analog storage planes. In other embodiments, the camera module offloads one or more ambient images prior to sampling a strobe image.

Figure 2:
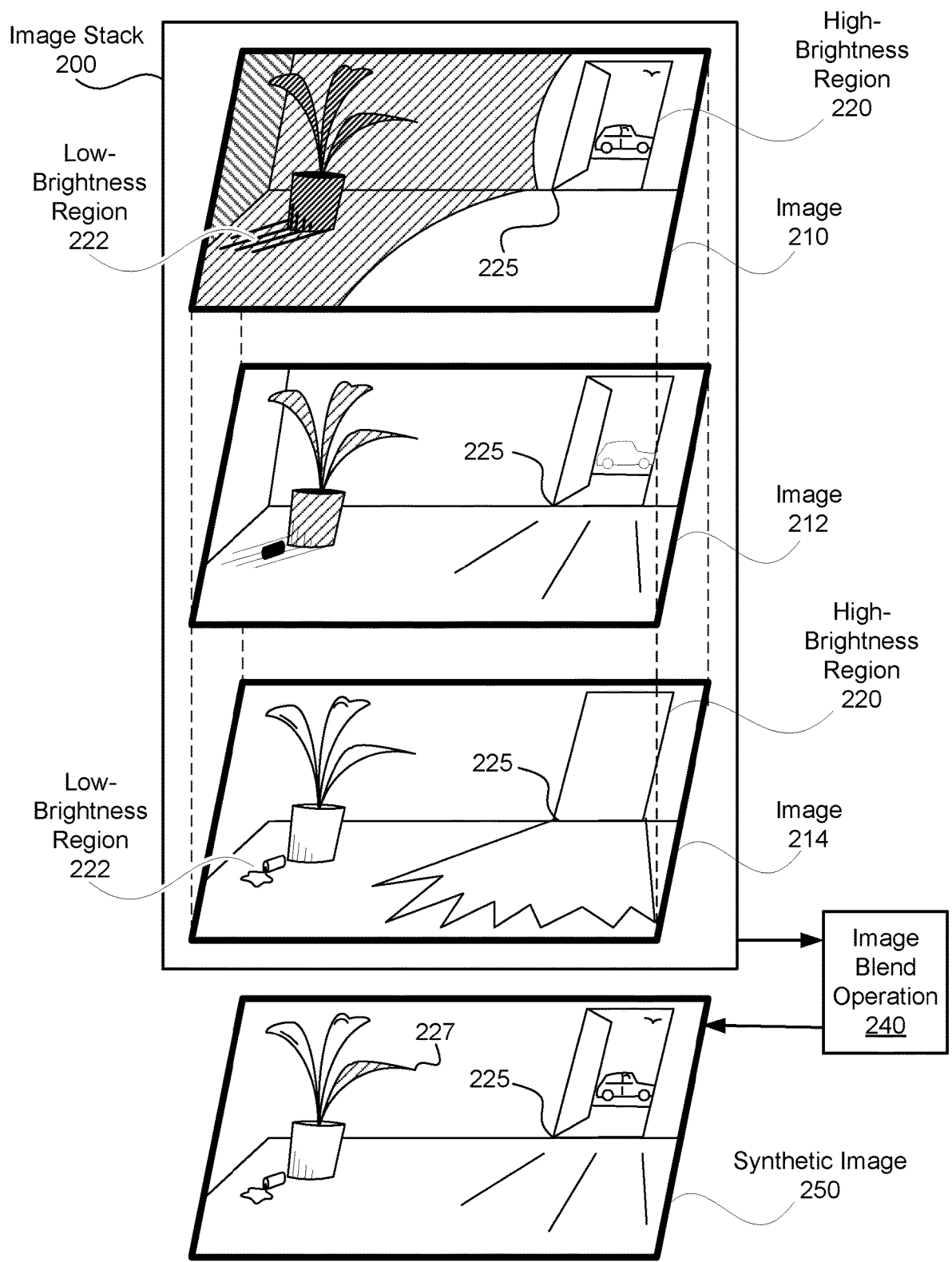
FIG. 2 illustrates generating a synthetic image from an image stack, according to one embodiment of the present invention.
Figure 3A:
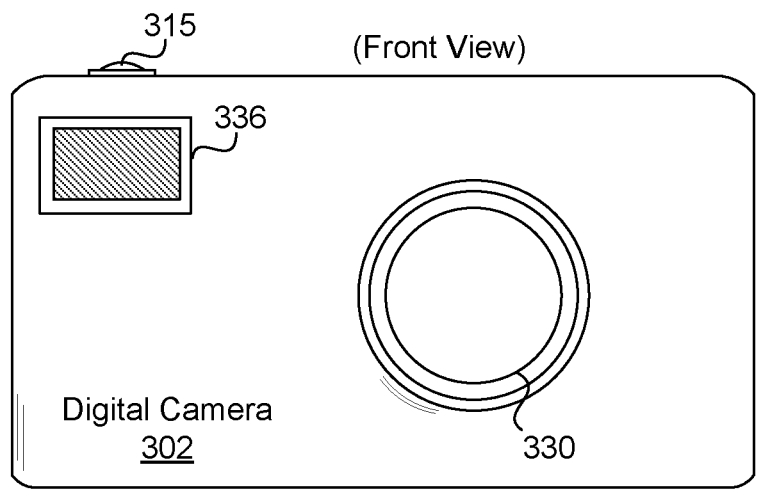
FIG. 3A illustrates a digital camera, configured to implement one or more aspects of the present invention.

FIG. 2 illustrates generating a synthetic image 250 from an image stack 200, according to one embodiment of the present invention. As shown, image stack 200 includes images 210, 212, and 214 of a photographic scene comprising a high brightness region 220 and a low brightness region 222. In this example, image 212 is exposed according to overall scene brightness, thereby generally capturing scene detail. Image 212 may also potentially capture some detail within high brightness region 220 and some detail within low brightness region 222. Image 210 is exposed to capture image detail within high brightness region 220. For example, image 210 may be exposed according to an exposure offset (e.g., one or more exposure stops down) relative to image 212. Alternatively, image 210 may be exposed according to local intensity conditions for one or more of the brightest regions in the scene. For example, image 210 may be exposed according to high brightness region 220, to the exclusion of other regions in the scene having lower overall brightness. Similarly, image 214 is exposed to capture image detail within low brightness region 222. To capture low brightness detail within the scene, image 214 may be exposed according to an exposure offset (e.g., one or more exposure stops up) relative to image 212. Alternatively, image 214 may be exposed according to local intensity conditions for one or more of the darker regions of the scene.

An image blend operation 240 generates synthetic image 250 from image stack 200. As depicted here, synthetic image 250 includes overall image detail, as well as image detail from high brightness region 220 and low brightness region 222. Image blend operation 240 may implement any technically feasible operation for blending an image stack. For example, any high dynamic range (HDR) blending technique may be implemented to perform image blend operation 240. Exemplary blending techniques known in the art include bilateral filtering, global range compression and blending, local range compression and blending, and the like.

To properly perform a blend operation, Images 210, 212, 214 need to be aligned to so that visible detail in each image is positioned in the same location in each image. For example, feature 225 in each image should be located in the same position for the purpose of blending images 210, 212, 214 to generate synthetic image 250. Misalignment can result in blurring or ghosting in synthetic image 250. Various techniques are known in the art for aligning images that may have been taken from a slightly different camera position. However, if scene content changes, then alignment may fail, leading to a poor quality synthetic image 250. Scene content may change in a conventional camera system because inter-sample time between images 210, 212, and 214 is sufficiently long so as to capture discernible movement of subjects comprising scene content for images comprising an image stack. In many typical scenarios, ten milliseconds or more of inter-sample time is sufficiently long to result in discernible movement of common photographic subject matter. Furthermore, in certain scenarios, camera shake introduces discernible blur into synthetic image 250.

Embodiments of the present invention serve to reduce or eliminate inter-sample time for two or more images comprising an image stack. In one embodiment, an image stack is captured by a digital photographic system, described below in greater detail. A strobe unit may be enabled to provide illumination in conjunction with sampling one or more images within the image stack.

FIG. 3A illustrates a digital camera 302, configured to implement one or more aspects of the present invention. Digital camera 302 includes a digital photographic system, such as digital photographic system 300 of FIG. 3C, configured to generate an image stack by sampling a photographic scene as described in conjunction with method 100 of FIG. 1A or method 102 of FIG. 1B. A camera module 330 is configured to sample images comprising the image stack.

Digital camera 302 may include a strobe unit 336, and may include a shutter release button 315 for triggering a photographic sample event, whereby digital camera 302 samples two or more images comprising an image stack. Any other technically feasible shutter release command may trigger the photographic sample event, such as a timer trigger or remote control receiver configured to generate a shutter release command.

Embodiments of the present invention advantageously enable the camera module 330 to sample images comprising the image stack with lower inter-sample time than conventional techniques. In certain embodiments, the images are sampled during overlapping time intervals, which may reduce the inter-sample time to zero. In other embodiments, the camera module 330 samples images in coordination with the strobe unit 336 to reduce inter-sample time between an image sampled without strobe illumination and an image sampled subsequently with strobe illumination.

Figure 3B:
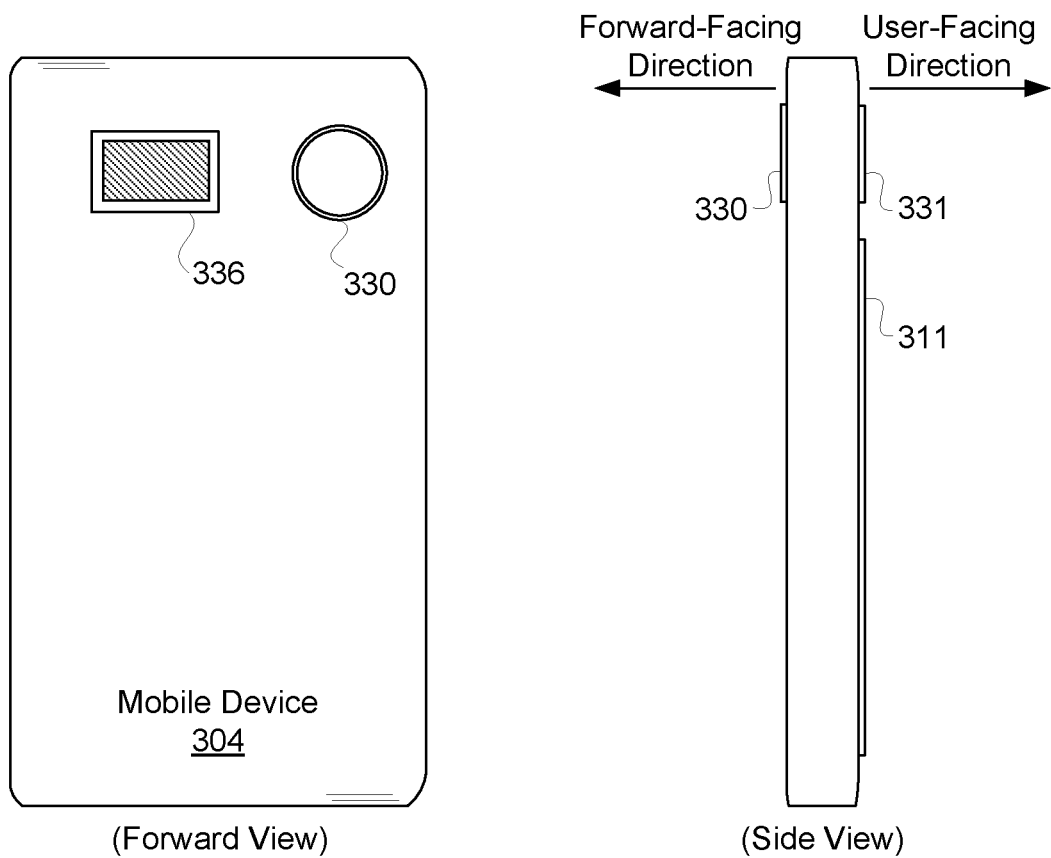
FIG. 3B illustrates a mobile device, configured to implement one or more aspects of the present invention.
Figure 3C:
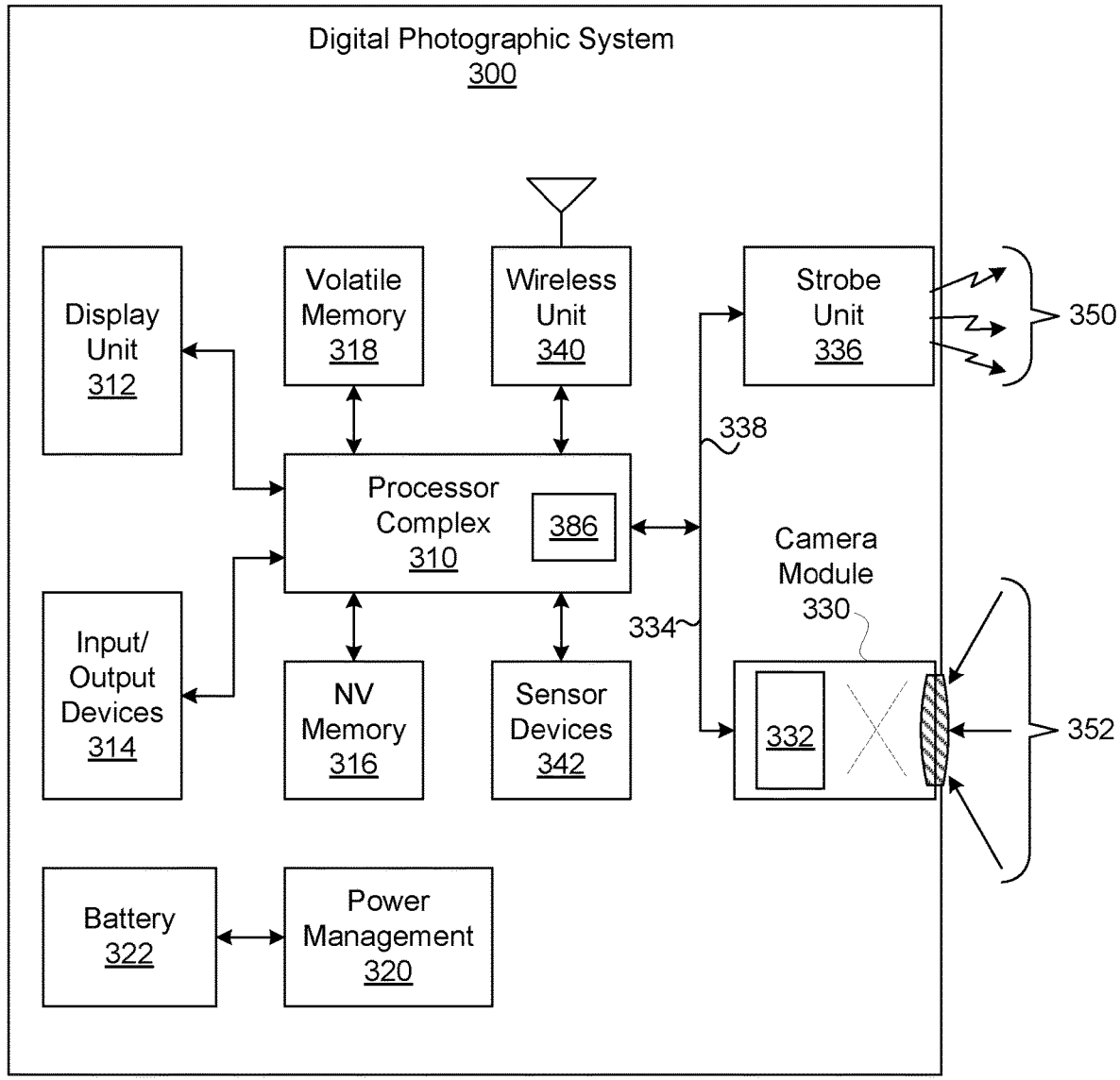
FIG. 3C illustrates a digital photographic system, configured to implement one or more aspects of the present invention.

FIG. 3B illustrates a mobile device 304, configured to implement one or more aspects of the present invention. Mobile device 304 includes a digital photographic system, such as digital photographic system 300 of FIG. 3C, configured to generate an image stack by sampling a photographic scene as described in conjunction with method 100 of FIG. 1A or method 102 of FIG. 1B. Camera module 330 is configured to sample images comprising the image stack.

A shutter release command may be generated through a mechanical button or a virtual button, which may be activated by a touch gesture on a touch entry display system 311 within mobile device 304, or by any other technically feasible trigger.

In one embodiment, the touch entry display system 311 is disposed on the opposite side of mobile device 304 from camera module 330. In certain embodiments, the mobile device 304 includes a user-facing camera module 331 and may include a user-facing strobe unit (not shown). The user-facing camera module 331 and user-facing strobe unit are configured to sample an image stack in accordance with method 100 of FIG. 1A or method 102 of FIG. 1B.

The digital camera 302 and the mobile device 304 may each generate and stores a synthetic image based on an image stack sampled by camera module 330. In one embodiment, the image stack includes a set of related images sampled under only ambient lighting. In another embodiment, the image stack includes at least one image sampled with strobe illumination, such as from strobe unit 336.

FIG. 3C illustrates a digital photographic system 300, configured to implement one or more aspects of the present invention. Digital photographic system 300 includes a processor complex 310 coupled to a camera module 330 and a strobe unit 336. Digital photographic system 300 may also include, without limitation, a display unit 312, a set of input/output devices 314, non-volatile memory 316, volatile memory 318, a wireless unit 340, and sensor devices 342, each coupled to processor complex 310. In one embodiment, a power management subsystem 320 is configured to generate appropriate power supply voltages for each electrical load element within digital photographic system 300. A battery 322 may be configured to supply electrical energy to power management subsystem 320. Battery 322 may implement any technically feasible energy storage system, including primary or rechargeable battery technologies.

In one embodiment, strobe unit 336 is integrated into digital photographic system 300 and configured to provide strobe illumination 350 during an image sample event performed by digital photographic system 300. In an alternative embodiment, strobe unit 336 is implemented as an independent device from digital photographic system 300 and configured to provide strobe illumination 350 during an image sample event performed by digital photographic system 300. Strobe unit 336 may comprise one or more LED devices. In certain embodiments, two or more strobe units are configured to synchronously generate strobe illumination in conjunction with sampling an image.

In one embodiment, strobe unit 336 is directed through a strobe control signal 338 to either emit strobe illumination 350 or not emit strobe illumination 350. The strobe control signal 338 may implement any technically feasible signal transmission protocol. Strobe control signal 338 may indicate a strobe parameter, such as strobe intensity or strobe color, for directing strobe unit 336 to generate a specified intensity and/or color of strobe illumination 350. Strobe control signal 338 may be generated by processor complex 310, camera module 330, or by any other technically feasible combination thereof. In one embodiment, strobe control signal 338 is generated by a camera interface unit 386 within the processor complex 310 and transmitted via an interconnect 334 to both the strobe unit 336 and the camera module 330. In another embodiment, strobe control signal 338 is generated by camera module 330 and transmitted to strobe unit 336 via interconnect 334.

Optical scene information 352, which may include strobe illumination 350 reflected from objects in the photographic scene, is focused as an optical image onto an image sensor 332, within camera module 330. Image sensor 332 generates an electronic representation of the optical image. The electronic representation comprises spatial color intensity information, which may include different color intensity samples, such as for red, green, and blue light. The spatial color intensity information may also include samples for white light. The electronic representation is transmitted to processor complex 310 via interconnect 334, which may implement any technically feasible signal transmission protocol.

Input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, input/output devices 314 include a capacitive touch input surface coupled to display unit 312.

Non-volatile (NV) memory 316 is configured to store data when power is interrupted. In one embodiment, NV memory 316 comprises one or more flash memory devices. NV memory 316 comprises a non-transitory computer-readable medium, which may be configured to include programming instructions for execution by one or more processing units within processor complex 310. The programming instructions may implement, without limitation, an operating system (OS), UI modules, image processing and storage modules, one or more modules for sampling an image stack through camera module 330, one or more modules for presenting the image stack or synthetic image generated from the image stack through display unit 312. The programming instructions may also implement one or more modules for merging images or portions of images within the image stack, aligning at least portions of each image within the image stack, or a combination thereof. In one embodiment, the programming instructions are configured to implement method 100 or FIG. 1A, method 102 of FIG. 1B, or a combination thereof. One or more memory devices comprising NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of digital photographic system 300.

Sensor devices 342 may include, without limitation, an accelerometer to detect motion and/or orientation, an electronic gyroscope to detect motion and/or orientation, a magnetic flux detector to detect orientation, a global positioning system (GPS) module to detect geographic position, or any combination thereof.

Wireless unit 340 may include one or more digital radios configured to send and receive digital data. In particular, wireless unit 340 may implement wireless standards known in the art as "WiFi" based on Institute for Electrical and Electronics Engineers (IEEE) standard 802.11, and may implement digital cellular telephony standards for data communication such as the well-known "3G" and "4G" suites of standards. Wireless unit 340 may further implement standards and protocols known in the art as LTE (long term evolution). In one embodiment, digital photographic system 300 is configured to transmit one or more digital photographs, sampled according to techniques taught herein, to an online or "cloud-based" photographic media service via wireless unit 340. The one or more digital photographs may reside within either NV memory 316 or volatile memory 318. In such a scenario, a user may possess credentials to access the online photographic media service and to transmit the one or more digital photographs for storage and presentation by the online photographic media service. The credentials may be stored or generated within digital photographic system 300 prior to transmission of the digital photographs. The online photographic media service may comprise a social networking service, photograph sharing service, or any other network-based service that provides storage and transmission of digital photographs. In certain embodiments, one or more digital photographs are generated by the online photographic media service based on an image stack sampled according to techniques taught herein. In such embodiments, a user may upload source images comprising an image stack for processing by the online photographic media service.

In one embodiment, digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (greater than forty-five degrees of sweep among cameras) to generate a panoramic photograph. The plurality of camera modules 330 may also be configured to sample two or more narrow angle views (less than forty-five degrees of sweep among cameras) to generate a stereoscopic photograph.

Display unit 312 is configured to display a two-dimensional array of pixels to form an image for display. Display unit 312 may comprise a liquid-crystal display, an organic LED display, or any other technically feasible type of display. In certain embodiments, display unit 312 is able to display a narrower dynamic range of image intensity values than a complete range of intensity values sampled over a set of two or more images comprising a given image stack. Here, images comprising the image stack may be merged according to any technically feasible HDR blending technique to generate a synthetic image for display within dynamic range constraints of display unit 312. In one embodiment, the limited dynamic range specifies an eight-bit per color channel binary representation of corresponding color intensities. In other embodiments, the limited dynamic range specifies a twelve-bit per color channel binary representation.

Figure 3D:
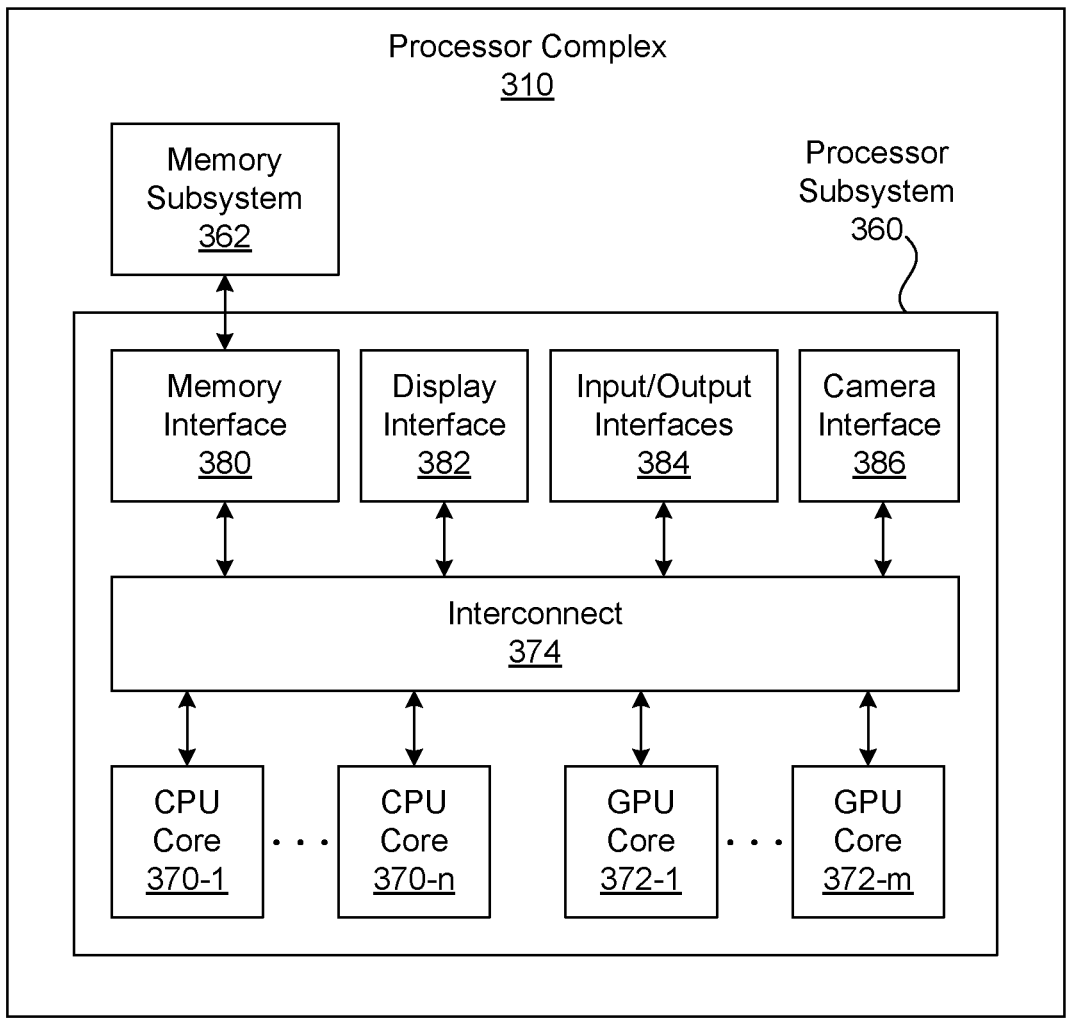
FIG. 3D illustrates a processor complex within the digital photographic system, in accordance with one embodiment.

FIG. 3D illustrates a processor complex 310 within digital photographic system 300 of FIG. 3C, according to one embodiment of the present invention. Processor complex 310 includes a processor subsystem 360 and may include a memory subsystem 362. In one embodiment, processor complex 310 comprises a system on a chip (SoC) device that implements processor subsystem 360, and memory subsystem 362 comprises one or more DRAM devices coupled to processor subsystem 360. In one implementation, processor complex 310 comprises a multi-chip module (MCM) encapsulating the SoC device and the one or more DRAM devices.

Processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within memory subsystem 362, volatile memory 318, NV memory 316, or any combination thereof. Each of the one or more CPU cores 370 may be configured to retrieve and store data through interconnect 374 and memory interface 380. Each of the one or more CPU cores 370 may include a data cache, and an instruction cache. Two or more CPU cores 370 may share a data cache, an instruction cache, or any combination thereof. In one embodiment, a cache hierarchy is implemented to provide each CPU core 370 with a private cache layer, and a shared cache layer.

Processor subsystem 360 may further include one or more graphics processing unit (GPU) cores 372. Each GPU core 372 comprises a plurality of multi-threaded execution units that may be programmed to implement graphics acceleration functions. GPU cores 372 may be configured to execute multiple thread programs according to well-known standards such as OpenGL™, OpenCL™, CUDA™, and the like. In certain embodiments, at least one GPU core 372 implements at least a portion of a motion estimation function, such as a well-known Harris detector or a well-known Hessian-Laplace detector. Such a motion estimation function may be used for aligning images or portions of images within the image stack.

Interconnect 374 is configured to transmit data between and among memory interface 380, display interface unit 382, input/output interfaces unit 384, CPU cores 370, and GPU cores 372. Interconnect 374 may implement one or more buses, one or more rings, a cross-bar, a mesh, or any other technically feasible data transmission structure or technique. Memory interface 380 is configured to couple memory subsystem 362 to interconnect 374. Memory interface 380 may also couple NV memory 316, volatile memory 318, or any combination thereof to interconnect 374. Display interface unit 382 is configured to couple display unit 312 to interconnect 374. Display interface unit 382 may implement certain frame buffer functions such as frame refresh. Alternatively, display unit 312 may implement frame refresh. Input/output interfaces unit 384 may be configured to couple various input/output devices to interconnect 374.

In certain embodiments, camera module 330 is configured to store exposure parameters for sampling each image in an image stack. When directed to sample an image stack, the camera module 330 samples the images comprising the image stack according to the stored exposure parameters. A software module comprising programming instructions executing within processor complex 310 may generate and store the exposure parameters prior to directing the camera module 330 to sample the image stack.

In one embodiment, exposure parameters associated with images comprising the image stack are stored within a parameter data structure. The camera interface unit 386 is configured to read exposure parameters from the parameter data structure and to transmit the exposure parameters to the camera module 330 in preparation of sampling an image stack. After the camera module 330 is configured according to the exposure parameters, the camera interface unit 386 directs the camera module 330 to sample an image stack. The data structure may be stored within the camera interface unit 386, within a memory circuit within processor complex 310, within volatile memory 318, within NV memory 316, or within any other technically feasible memory circuit. A software module executing within processor complex 310 may generate and store the data structure.

In one embodiment, the camera interface unit 386 transmits exposure parameters and commands to camera module 330 through interconnect 334. In certain embodiments, the camera interface unit 386 is configured to directly control the strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization is defined to be less than five hundred microseconds of event timing error.

In other embodiments, a software module executing within processor complex 310 directs the operation and synchronization of camera module 330 and the strobe unit 336, with potentially reduced performance, such as event timing error of more than one millisecond.

In one embodiment, camera interface unit 386 is configured to accumulate statistics while receiving image data from the camera module 330. In particular, the camera interface unit 386 may accumulate exposure statistics for a given image while receiving image data for the image through interconnect 334. Exposure statistics may include an intensity histogram, a count of over-exposed pixels, a counter of under-exposed pixels, an intensity-weighted sum of pixel intensity, or any combination thereof. The camera interface unit 386 may present the exposure statistics as memory-mapped storage locations within a physical or virtual address space defined by a processor, such as a CPU core 370, within processor complex 310. In one embodiment, the exposure statistics are mapped in a memory-mapped register space, which may be accessed through interconnect 334. In other embodiments, the exposure statistics are transmitted in conjunction with transmitting pixel data for a captured image. For example, the exposure statistics for a given image may be transmitted as in-line data, following transmission of pixel intensity data for the image. Exposure statistics may be cached within camera interface 386, after being received from camera module 330.

In certain embodiments, camera interface unit 386 accumulates color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. In one embodiment, camera interface unit 386 accumulates spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334. In other embodiments, the color statistics are transmitted in conjunction with transmitting pixel data for a captured image. For example, the color statistics for a given image may be transmitted as in-line data, following transmission of pixel intensity data for the image. Color statistics may be cached within camera interface 386 after being received from camera module 330.

In one embodiment, camera module 330 transmits strobe control signal 338 to strobe unit 336, enabling strobe unit 336 to generate illumination while the camera module 330 is sampling an image. In another embodiment, camera module 330 samples an image illuminated by strobe unit 336 upon receiving an indication from camera interface unit 386 that strobe unit 336 is enabled. In yet another embodiment, camera module 330 samples an image illuminated by strobe unit 336 upon detecting strobe illumination within a photographic scene via a rapid rise in scene illumination. In still yet another embodiment, camera module 330 enables strobe unit 336 to generate strobe illumination while sampling one image and disables strobe unit 336 while sampling a different image.

Figure 3E:
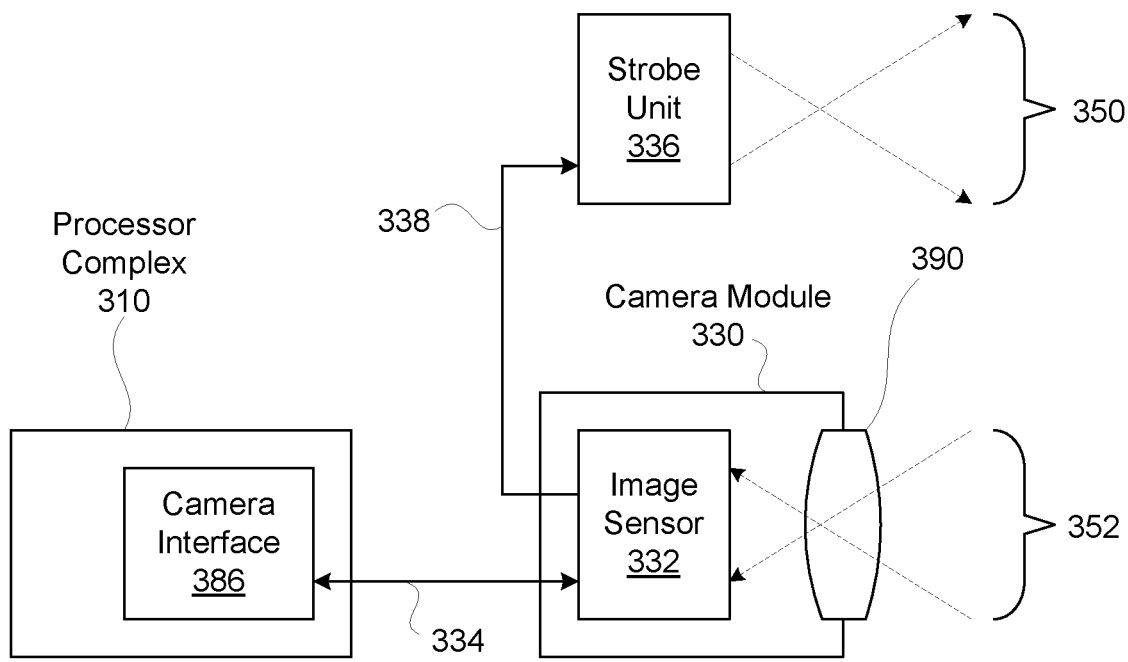
FIG. 3E illustrates a camera module configured to control a strobe unit through a strobe control signal, according to one embodiment of the present invention.

FIG. 3E illustrates camera module 330 configured to control strobe unit 336 through strobe control signal 338, according to one embodiment of the present invention. Lens 390 is configured to focus optical scene information 352 onto image sensor 332 to be sampled. As shown, image sensor 332, within the camera module 330, is configured to generate strobe control signal 338 to enable strobe unit 336 while sampling an image specified to include strobe illumination as part of an image exposure specification. Furthermore, image sensor 332 is configured to disable strobe unit 336 through strobe control signal 338 when sampling an image specified to not include strobe illumination. Image sensor 332 advantageously controls detailed timing of strobe unit 336 to reduce inter-sample time between one or more images sampled with strobe unit 336 enabled and one or more images sampled with strobe unit 336 disabled. For example, inter-sample time between one or more images may be reduced to less than one microsecond. Image sensor 332 is thus able to directly control sampling operations, including enabling and disabling strobe unit 336, associated with generating an image stack, which may comprise at least one image sampled with strobe unit 336 disabled, and at least one image sampled with strobe unit 336 either enabled or disabled. In one embodiment, data comprising the image stack sampled by image sensor 332 is transmitted via interconnect 334 to camera interface unit 386 within processor complex 310. In certain embodiments, camera module 330 includes control circuitry (not shown), configured to generate strobe control signal 338 in conjunction with controlling operation of the image sensor 332.

Figure 3F:
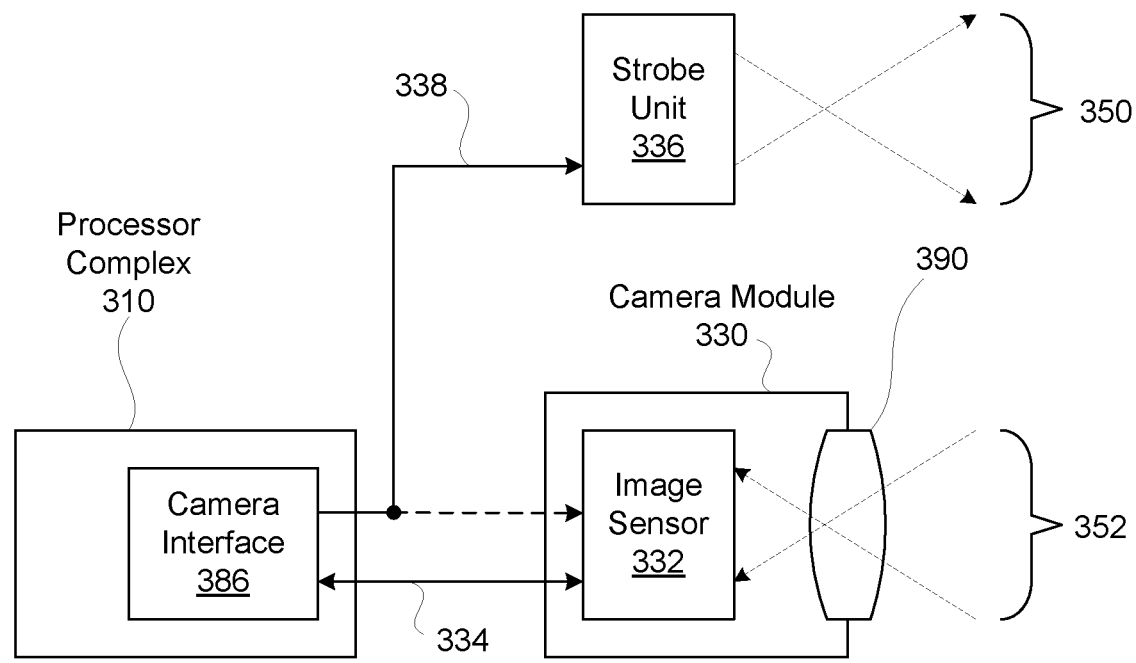
FIG. 3F illustrates a camera module configured to sample an image based on state information for a strobe unit, according to one embodiment of the present invention.

FIG. 3F illustrates a camera module 330 configured to sample an image based on state information for strobe unit 336, according to one embodiment of the present invention. Commands for configuring state information associated with the strobe unit 336 are transmitted through strobe control signal 338, which may be sampled by camera module 330 to detect when strobe unit 336 is enabled with relatively fine time resolution. For example, camera module 330 may detect when strobe unit 336 is enabled or disable within a microsecond or less of being enabled or disabled. To sample an image requiring strobe illumination, camera interface unit 386 enables strobe unit 336 by sending an enable command through strobe control signal 338. The enable command may comprise a signal level transition, a data packet, a register write, or any other technically feasible transmission of a command. Camera module 330 senses that strobe unit 336 is enabled and may cause image sensor 332 to sample one or more images requiring strobe illumination while strobe unit 336 is enabled.

Figure 4A:
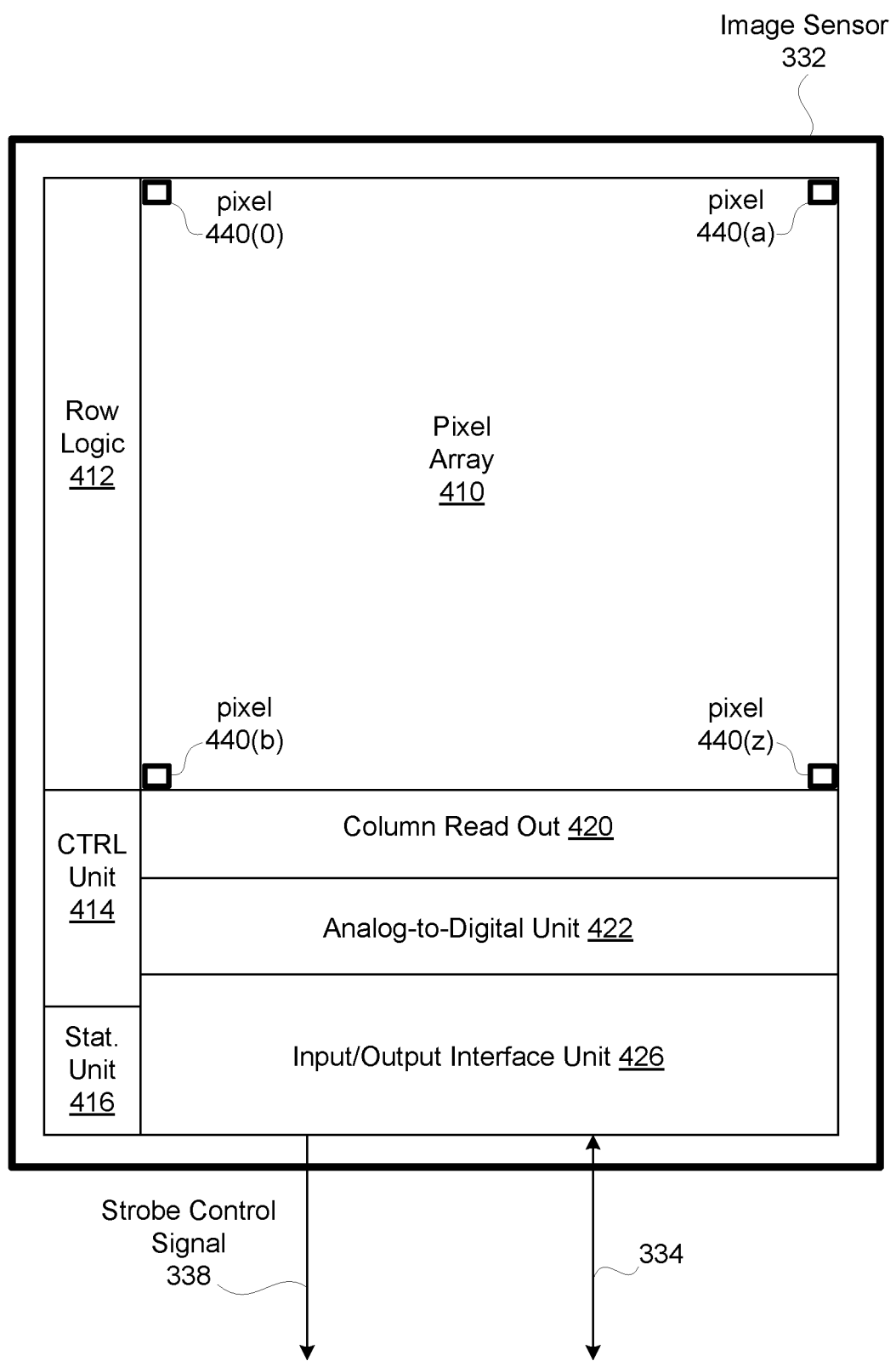
FIG. 4A illustrates a block diagram of image sensor, according to one embodiment of the present invention.

FIG. 4A illustrates a block diagram of image sensor 332, according to one embodiment of the present invention. As shown, image sensor 332 comprises row logic 412, a control (CTRL) unit 414, a pixel array 410, a column read out circuit 420, an analog-to-digital unit 422, and an input/output interface unit 426. The image sensor 332 may also include a statistics unit 416.

Pixel array 410 comprises a two-dimensional array of pixels 440 configured to sample focused optical image information and generate a corresponding electrical representation. Each pixel 440 samples intensity information for locally incident light and stores the intensity information within associated analog sampling circuits. In one embodiment, the intensity information comprises a color intensity value for each of a red, a green, and a blue color channel. Row logic 412 includes logic circuits configured to drive row signals associated with each row of pixels. The row signals may include, without limitation, a reset signal, a row select signal, and at least two independent sample control signals. One function of a row select signal is to enable switches associated with analog sampling circuits within a row of pixels to couple analog signal values (e.g., analog current values or analog voltage values) to a corresponding column output signal, which transmits the analog signal value to column read out circuit 420. Column read out circuit 420 may be configured to multiplex the column output signals to a smaller number of column sample signals, which are transmitted to analog-to-digital unit 422. Column read out circuit 420 may multiplex an arbitrary ratio of column output signals to column sample signals. Analog-to-digital unit 422 quantizes the column sample signals for transmission to interconnect 334 via input/output interface 426.

In one embodiment, the analog signal values comprise analog currents, and the analog-to-digital unit 422 is configured to convert an analog current to a corresponding digital value. In other embodiments, column read out circuit 420 is configured to convert analog current values to corresponding analog voltage values (e.g. through a transimpedance amplifier or TIA), and the analog-to-digital unit 422 is configured to convert the analog voltage values to corresponding digital values. In certain embodiments, column read out circuit 420 implements an analog gain function, which may be configured according to a digital gain value.

In one embodiment, control unit 414 is configured to generate detailed timing control signals for coordinating operation of row logic 412, column read out circuit 420, analog-to-digital unit 422, input output interface unit 426, and statistics unit 416.

In one embodiment, statistics unit 416 is configured to monitor pixel data generated by analog-to-digital unit 422 and, from the monitored pixel data, generate specified image statistics. The image statistics may include, without limitation, histogram arrays for individual pixel color channels for an image, a histogram array for intensity values derived from each pixel intensity value for an image, intensity sum values for each color channel taken over an image, a median intensity value for an image, an exposure value (EV) for an image, and the like. Image statistics may further include, without limitation, a pixel count for pixels meeting certain defined criteria, such as a pixel count for pixels brighter than a high threshold intensity, a pixel count for pixels darker than a low threshold intensity, a weighted pixel sum for pixels brighter than a high threshold intensity, a weighted pixel sum for pixels darker than a low threshold intensity, or any combination thereof. Image statistics may further include, without limitation, curve fitting parameters, such as least squares parameters, for linear fits, quadratic fits, non-quadratic polynomial fits, exponential fits, logarithmic fits, and the like.

Image statistics may further include, without limitation, one or more parameters computed from one or more specified subsets of pixel information sampled from pixel array 410. One exemplary parameter defines a subset of pixels to be a two-dimensional contiguous region of pixels associated with a desired exposure point. Here, an exposure parameter may be computed, for example, as a median intensity value for the region, or as a count of pixels exceeding a threshold brightness for the region. For example, a rectangular region corresponding to an exposure point may be defined within an image associated with the pixel array, and a median intensity may be generated for the rectangular region, given certain exposure parameters such as exposure time and ISO sensitivity.

Image statistics may be accumulated and computed as digital samples become available from pixel array 410. For example, image statistics may be accumulated as digital samples are generated by the analog-to-digital unit 422. In certain embodiments, the samples may be accumulated during transmission through interconnect 334. In one embodiment, the image statistics are mapped in a memory-mapped register space, which may be accessed through interconnect 334. In other embodiments, the image statistics are transmitted in conjunction with transmitting pixel data for a captured image. For example, the image statistics for a given image may be transmitted as in-line data, following transmission of pixel intensity data for the image.

In one embodiment, image statistics are computed using a fixed-function logic circuit comprising statistics unit 416. In other embodiments, image statistics are computed via a programmable processor comprising statistics unit 416. In certain embodiments, programming instructions may be transmitted to the programmable processor via interconnect 334.

In one embodiment, control unit 414 is configured to adjust exposure parameters for pixel array 410 based on images statistics for a previous image. In this way, image sensor 332 may advantageously determine proper exposure parameters per one or more specified exposure points without burdening processor resources within processor complex 310, and without incurring concomitant latencies. The proper exposure parameters may be determined by sampling sequential images and adjusting the exposure parameters for each subsequent image based on exposure parameters for a corresponding previous image. The exposure parameters for a given captured image may be read by camera interface unit 386 and stored as metadata for the image.

In one embodiment, input/output interface unit 426 is configured to modify pixel intensity data associated with a captured frame based on certain image statistics. In one implementation, input/output interface unit 426 adjusts white balance of an image during transmission of image data through interconnect 334. Red, green, and blue components of each pixel may be scaled based on previously computed image statistics. Such image statistics may include a sum of red, green, and blue components. With these sums, input/output interface unit 426 may be configured to perform a conventional gray world white balance correction. Alternatively, the image statistics may include quadratic curve fit parameters. With quadratic fit components, input/output interface unit 426 may be configured to perform a quadratic white balance mapping. Additional embodiments provide for illuminator identification via selecting for pixels above a lower threshold and below an upper threshold for consideration in determining white balance. Still further embodiments provide for color temperature identification by mapping selected samples to a color temperature snap-point. Mapping color temperature to a snap-point thereby applies an assumption that scene illumination is provided by an illuminator having a standard color temperature. In each example, image statistics may be optionally applied to adjust pixel information prior to transmission via interconnect 334.

In an alternative embodiment, statistics unit 416, as well as pixel modification functions discussed herein with respect to input/output interface unit 426 are instead implemented within sensor interface 386, residing within processor complex 310. In such an embodiment, power and heat dissipation associated with statistics unit 416 and related pixel modification functions is shifted away from pixel array 410, which may incorporate circuitry that is sensitive to heat. In another alternative embodiment, statistics unit 416, as well as pixel modification functions discussed herein with respect to input/output interface unit 426 are instead implemented within a separate die disposed within camera module 330. In such an embodiment, related power and heat dissipation is also shifted away from pixel array 410. In this embodiment, camera module 330 is configured to offer statistics and pixel modification functions in conjunction with a conventional processor complex 310, which may be configured to include a conventional sensor interface.

Figure 4B:
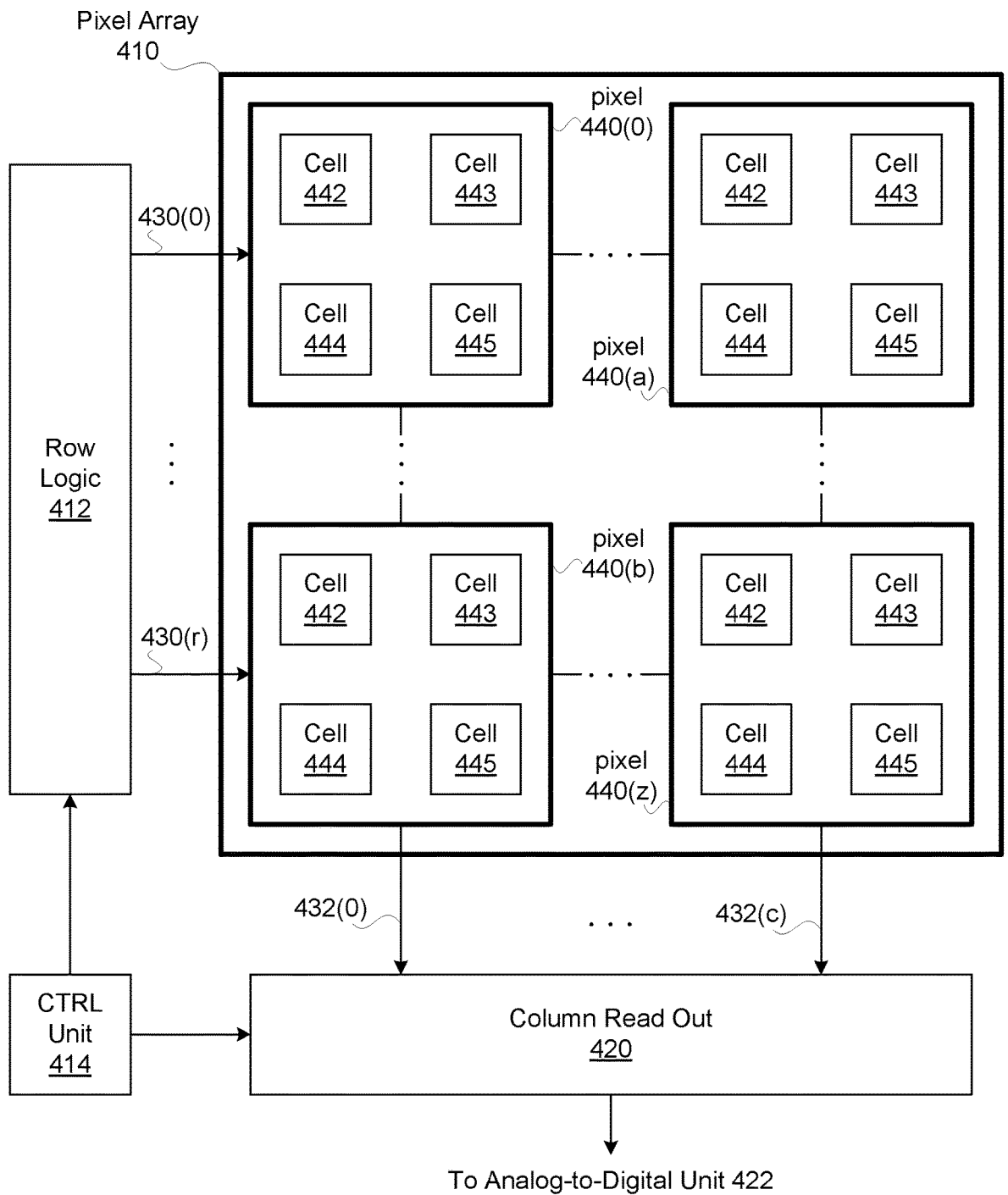
FIG. 4B illustrates a pixel array within an image sensor, according to one embodiment of the present invention.

FIG. 4B illustrates a pixel array 410 within image sensor 332, according to one embodiment of the present invention. Pixel array 410 comprises one or more pixels 440, and each pixel comprises one or more cells. As shown, each pixel comprises cells 442, 443, 444, and 445. Each cell is configured to convert an incident light signal into a corresponding electrical signal. The electrical signal may be integrated over time during an exposure period for each cell. An integrated electrical signal may then be transmitted via column signals 432 to analog-to-digital unit 422 by way of column read out circuit 420. Analog-to-digital unit 422 converts integrated electrical signals to a corresponding digital value as part of an overall process of digitizing an image captured within pixel array 410. Row logic 412 generates row control signals 430, configured to provide reset, row selection, and exposure sample time control for each corresponding row of pixels 440. For example, row control signals 430(0) may be configured to direct pixels 440(0)-440(a) to initialize state, capture an optical signal, and convert the optical signal to a set of corresponding integrated electrical signals residing within pixels 440(0)-440(a). Row control signals 430(0) then direct pixels 440(0)-440(a) to drive corresponding integrated electrical signals onto column signals 432(0)-432(c), availing at least a portion of the integrated electrical signals within a row of pixels 440 to analog-to-digital unit 422 for conversion to corresponding digital values.

Figure 4C:
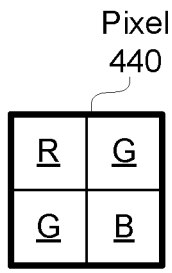
FIG. 4C illustrates a color filter configuration comprising red, green, and blue filters for one pixel within a pixel array, according to one embodiment of the present invention.

FIG. 4C illustrates a color filter configuration comprising red, green, and blue filters for one pixel 440 of FIG. 4B within pixel array 410 of FIG. 4A, according to one embodiment of the present invention. As shown, color filters for red, green, green, and blue are organized to intercept and filter incident light transmitted optically to corresponding cells. For example, cell 442 within pixel cell 440(0) of FIG. 4B receives incident light filtered by a red (R) filter, cell 443 of cell 440(0) receives focused incident light filtered by a green (G) filter, and so forth.

Figure 4D:
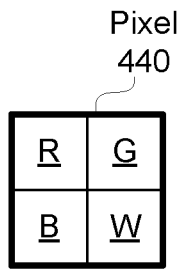
FIG. 4D illustrates a color filter configuration comprising red, green, blue, and white filters for one pixel within a pixel array, according to one embodiment of the present invention.

FIG. 4D illustrates a color filter configuration comprising red, green, blue, and white filters for one pixel 440 within pixel array 410, according to one embodiment of the present invention. Here, a clear (white) filter is used to provide greater intensity sensitivity for one cell within pixel 440. For example, cell 445 of pixel 440(0) may receive white incident light, providing greater overall intensity than red, green, or blue filtered incident light, received by cells 442, 443, and 444.

Figure 4E:
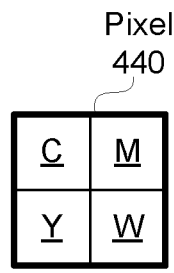
FIG. 4E illustrates a color filter configuration comprising cyan, magenta, yellow, and white filters for one pixel within a pixel array, according to one embodiment of the present invention.

FIG. 4E illustrates a color filter configuration comprising cyan, magenta, yellow, and white filters for one pixel 440 within pixel array 410, according to one embodiment of the present invention. Here, a cyan, magenta, yellow (CMY) color space is sensed by cells 442, 443, 444, while cell 445 senses intensity based a white sample of incident light for greater overall sensitivity.

Figure 4F:
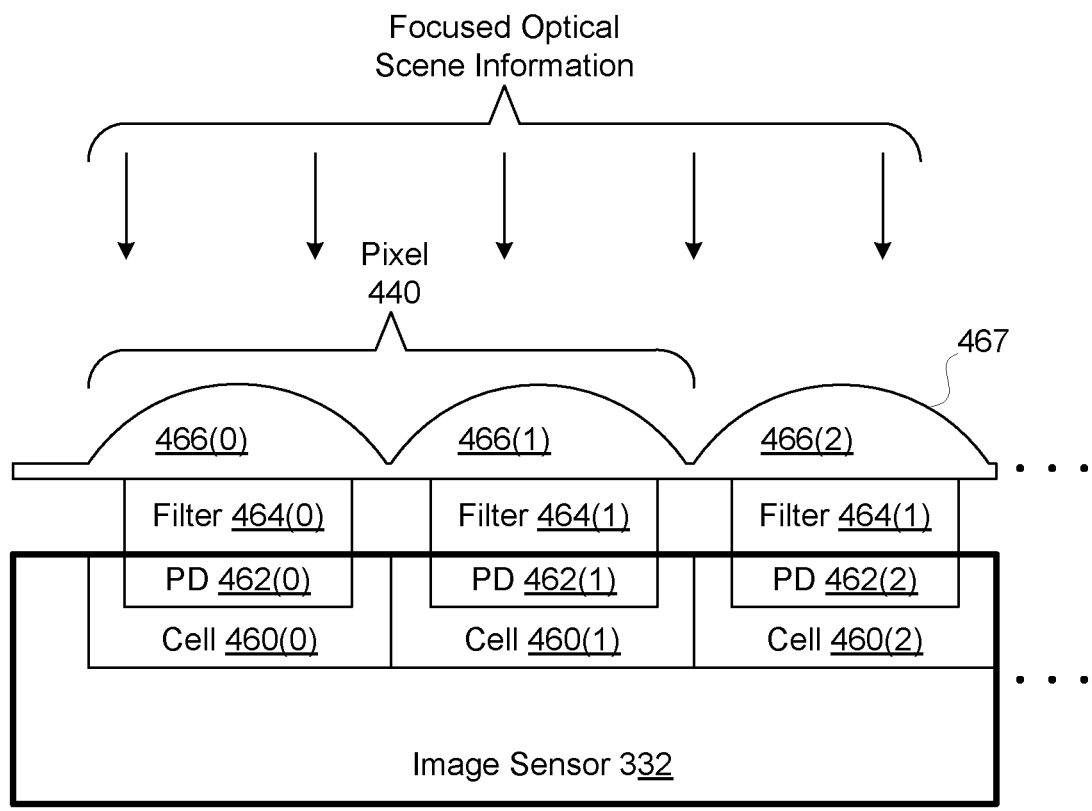
FIG. 4F illustrates a cross-section of color cells within a pixel array, according to one embodiment of the present invention.

FIG. 4F illustrates a cross-section of cells 460 within pixel array 410, according to one embodiment of the present invention. A lens array 467 comprises an array of micro lenses 466, each fabricated to align with a corresponding photo detector/photo diode (PD) 462 residing within an associated cell 460. In one embodiment cells 460(0) and 460(1) correspond to cells 442 and 443, respectively. A filter 464 determines which color of light a given color cell 460 receives for detection. Here, color refers to a range of wavelengths that generally corresponds to human color perception. Each micro lens 466 is configured to concentrate incident light, from focused optical scene information, into PD 462. By concentrating light from a larger surface area than that of PD 462, greater sensitivity may be achieved.

Figure 5:
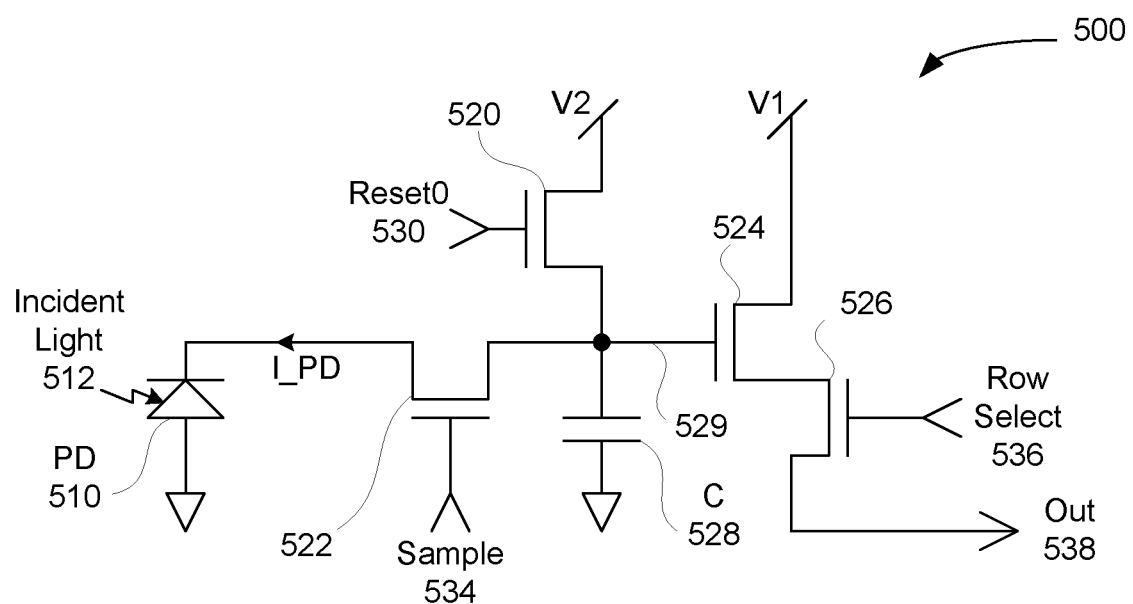
FIG. 5 is a circuit diagram for a photo-sensitive cell within a pixel implemented using complementary-symmetry metal-oxide semiconductor devices, according.

FIG. 5 is a circuit diagram for a conventional photosensitive cell 500 within a pixel, implemented using complementary-symmetry metal-oxide semiconductor (CMOS) devices. Photo-sensitive cell 500 may be used to implement cells comprising a conventional pixel. A photodiode (PD) 510 is configured to convert incident light 512 into a photodiode current (I_PD). Field-effect transistors (FETs) 520, 522, 524, 526, and capacitor C 528 are configured to integrate the photodiode current over an exposure time, to yield a resulting charge associated with capacitor C 528. Capacitor C 528 may comprise a distinct capacitor structure, as well as gate capacitance associated with FET 524, and diffusion to well capacitance, such as drain capacitance, associated with FETS 520, 522.

FET 520 is configured to provide a path to charge node 529 to a voltage associated with voltage supply V2 when reset0 530 is active (e.g., low). FET 522 provides a path for the photodiode current to discharge node 529 in proportion to an intensity of incident light 512, thereby integrating incident light 512, when sample 534 is active (e.g., high). The resulting charge associated with capacitor C 528 is an integrated electrical signal that is proportional to the intensity of incident light 512 during the exposure time. The resulting charge provides a voltage potential associated with node 529 that is also proportional to the intensity of incident light 512 during the exposure time.

When row select 536 is active (e.g., high), FET 526 provides a path for an output signal current from voltage source V1 through FET 524, to out 538. FET 524 converts a voltage on node 529, into a corresponding output current signal through node out 538. During normal operation, incident light sampled for an exposure time corresponding to an active time for sample 534 is represented as a charge on capacitor C 528. This charge may be coupled to output signal out 538 and read as a corresponding current value. This circuit topology facilitates non-destructive reading of charge on node 529.

Figure 6A:
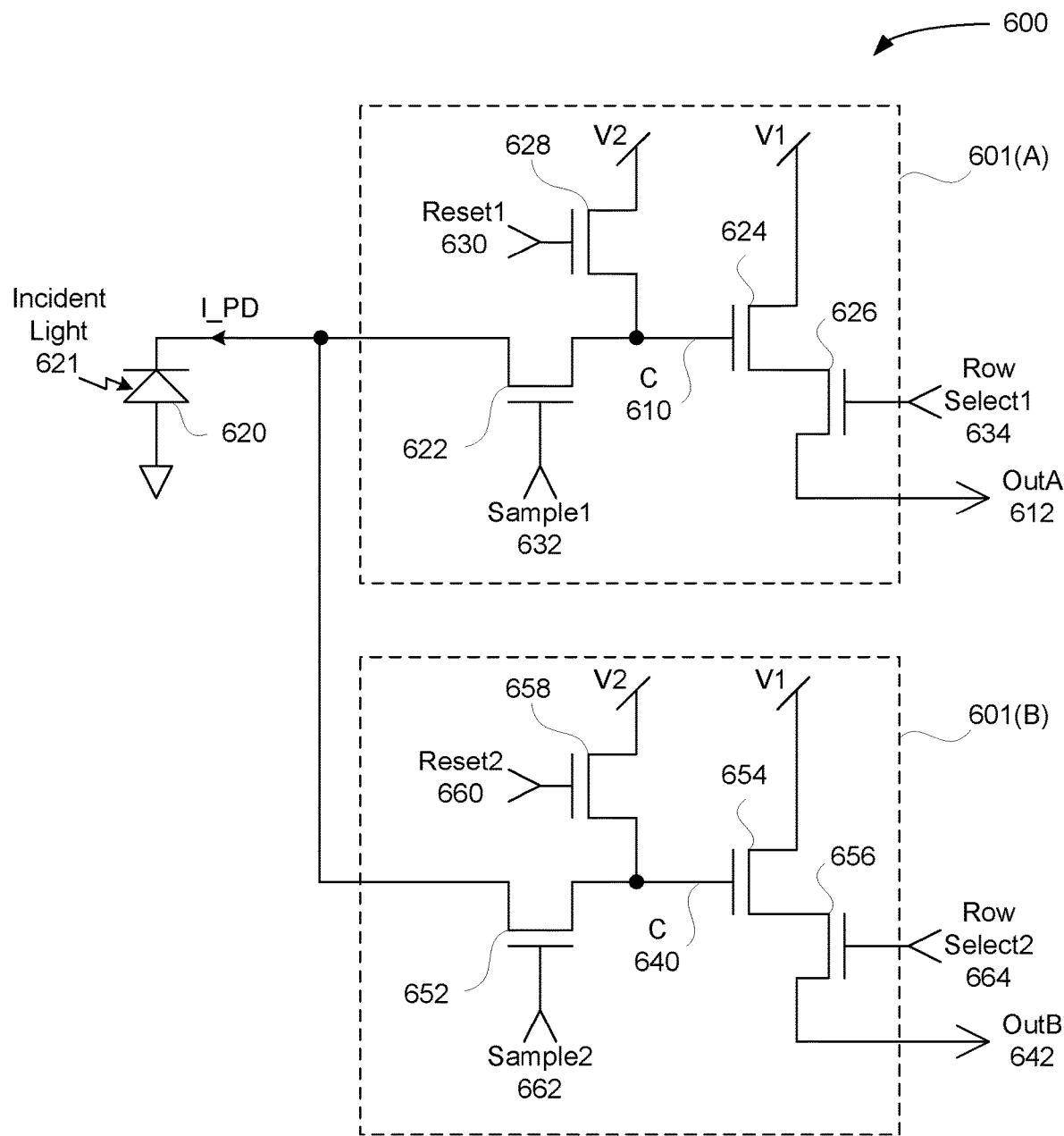
FIG. 6A is a circuit diagram for a first photo-sensitive cell, according to one embodiment.

FIG. 6A is a circuit diagram for a photo-sensitive cell 600, according to one embodiment. An instance of photo-sensitive cell 600 may implement one cell of cells 442-445 comprising a pixel 440. As shown, photo-sensitive cell 600 comprises two analog sampling circuits 601, and photodiode 620. Analog sampling circuit 601(A) comprises FETs 622, 624, 626, 628, and node C 610. Analog sampling circuit 601(B) comprises FETs 652, 654, 656, 658, and node C 640.

Node C 610 represents one node of a capacitor that includes gate capacitance for FET 624 and diffusion capacitance for FETs 622 and 628. Node C 610 may also be coupled to additional circuit elements (not shown) such as, without limitation, a distinct capacitive structure, such as a metal-oxide stack, a poly capacitor, a trench capacitor, or any other technically feasible capacitor structures. Node C 640 represents one node of a capacitor that includes gate capacitance for FET 654 and diffusion capacitance for FETs 652 and 658. Node C 640 may also be coupled to additional circuit elements (not shown) such as, without limitation, a distinct capacitive structure, such as a metal-oxide stack, a poly capacitor, a trench capacitor, or any other technically feasible capacitor structures.

When reset1 630 is active (low), FET 628 provides a path from voltage source V2 to node C 610, causing node C 610 to charge to the potential of V2. When sample1 632 is active, FET 622 provides a path for node C 610 to discharge in proportion to a photodiode current (I_PD) generated by photodiode 620 in response to incident light 621. In this way, photodiode current I_PD is integrated for a first exposure time when sample1 632 is active, resulting in a corresponding voltage on node C 610. When row select 634 is active, FET 626 provides a path for a first output current from V1 to output outA 612. The first output current is generated by FET 624 in response to the voltage on C 610. When row select 634 is active, the output current at outA 612 is therefore proportional to the integrated intensity of incident light 621 during the first exposure time.

When reset2 660 is active (low), FET 658 provides a path from voltage source V2 to node C 640, causing node C 640 to charge to the potential of V2. When sample2 662 is active, FET 652 provides a path for node C 640 to discharge according to a photodiode current (I_PD) generated by photodiode 620 in response to incident light 621. In this way, photodiode current I_PD is integrated for a second exposure time when sample2 662 is active, resulting in a corresponding voltage on node C 640. When row select 664 is active, FET 656 provides a path for a second output current from V1 to output outB 642. The second output current is generated by FET 654 in response to the voltage on C 640. When row select 664 is active, the output current at outB 642 is therefore proportional to the integrated intensity of incident light 621 during the second exposure time.

Photo-sensitive cell 600 includes independent reset signals reset1 630 and reset2 660, independent sample signals sample1 632 and sample2 662, independent row select signals row select1 634 and row select2 664, and independent output signals outA 612 and outB 642. In one embodiment, column signals 432 of FIG. 4B comprise independent signals outA 612 and outB 642 for each cell within each pixel 440 within a row of pixels. In one embodiment, row control signals 430 comprise signals for row select1 634 and row select2 664, which are shared for a given row of pixels.

A given row of instances of photo-sensitive cell 600 may be selected to drive respective outA 612 signals through one set of column signals 432. The row of instances of photo-sensitive cell 600 may also be selected to independently drive respective outB 642 signals through a second, parallel set of column signals 432. In one embodiment, reset1 630 is coupled to reset2 660, and both are asserted together.

Summarizing the operation of photo-sensitive cell 600, two different samples of incident light 621 may be captured and stored independently on node C 610 and node C 640. An output current signal corresponding to the first sample of the two different samples may be coupled to output outA 612 when row select1 634 is active. Similarly, an output current signal corresponding to the second of the two different samples may be coupled to output outB 642 when row select2 664 is active.

Figure 6B:
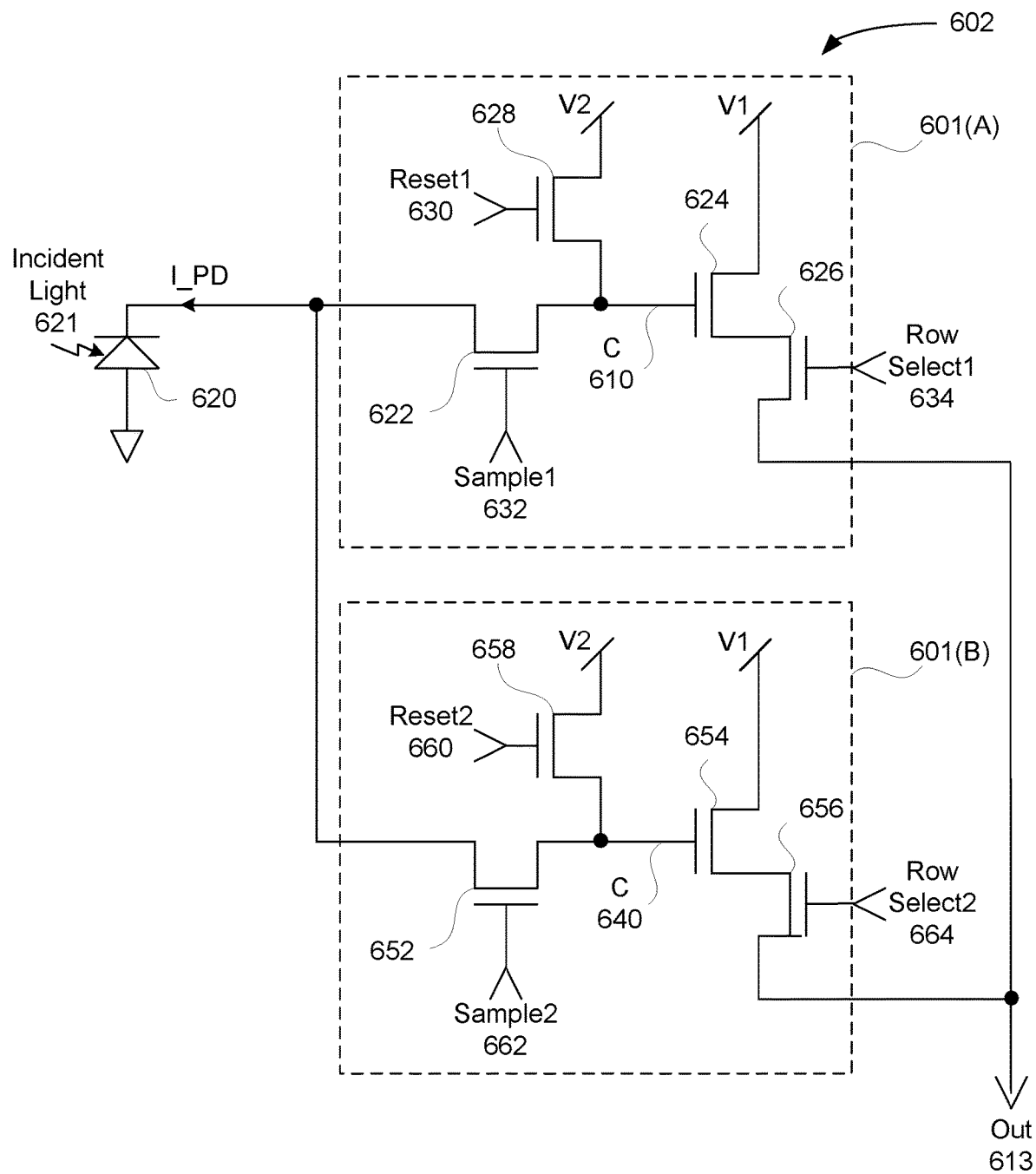
FIG. 6B is a circuit diagram for a second photo-sensitive cell, according to one embodiment.

FIG. 6B is a circuit diagram for a photo-sensitive cell 602, according to one embodiment. An instance of photo-sensitive cell 602 may implement one cell of cells 442-445 comprising a pixel 440. Photo-sensitive cell 602 operates substantially identically to photo-sensitive cell 600 of FIG. 6A, with the exception of having a combined output signal out 613 rather than independent output signals outA 612, outB 642. During normal operation of photo-sensitive cell 602, only one of row select1 634 and row select2 664 should be driven active at any one time. In certain scenarios, photo-sensitive cell 602 may be designed to advantageously implement cells requiring less layout area devoted to column signals 432 than photo-sensitive cell 600.

Figure 6C:
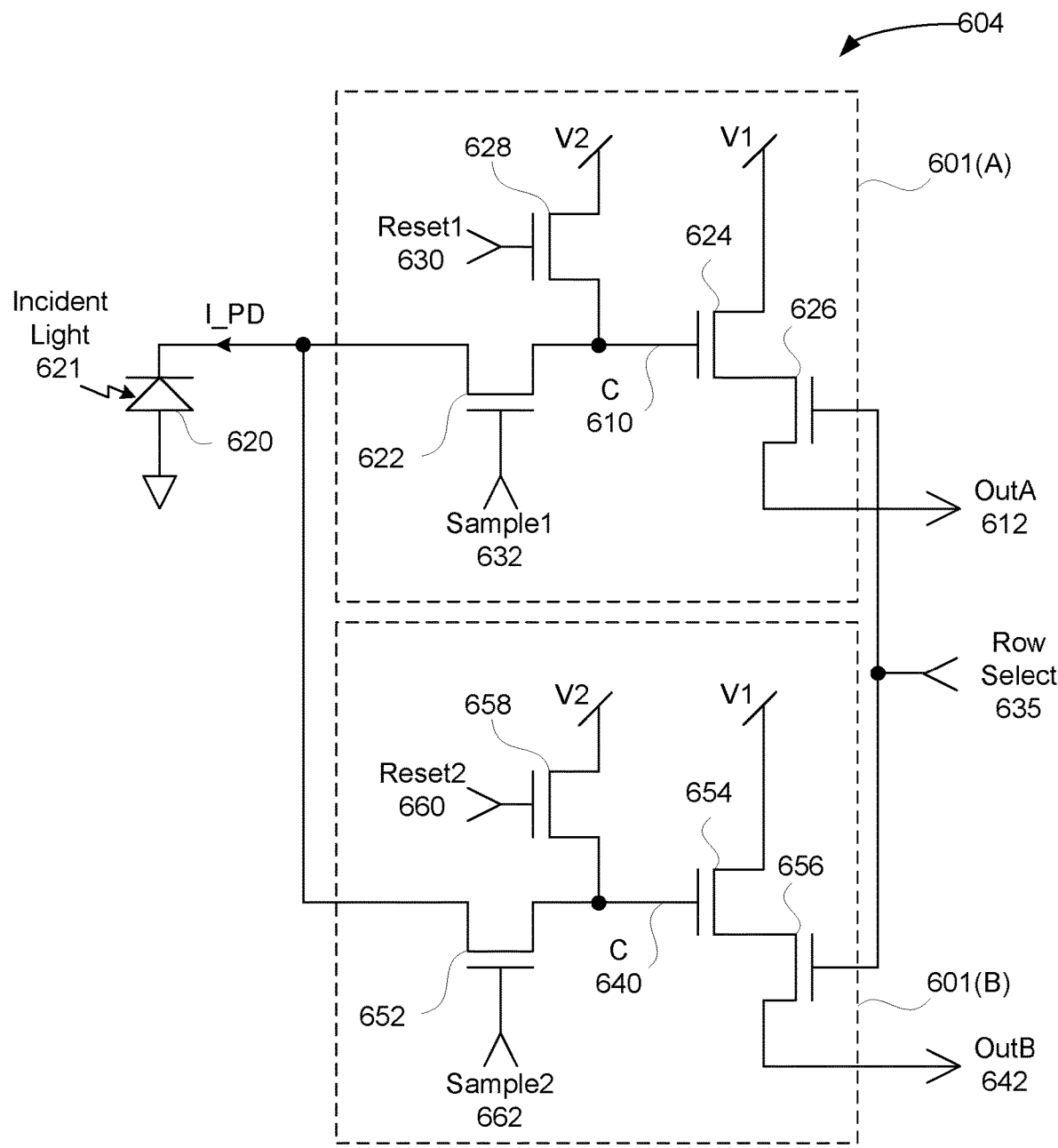
FIG. 6C is a circuit diagram for a third photo-sensitive cell, according to one embodiment.

FIG. 6C is a circuit diagram for a photo-sensitive cell 604, according to one embodiment. Photo-sensitive cell 604 operates substantially identically to sensitive cell 600 of FIG. 6A, with the exception of implementing a combined row select 635 rather than independent row select signals row select1 634 and row select2 664. Photo-sensitive cell 604 may be used to advantageously implement cells requiring less layout area devoted to row control signals 430.

Although photo-sensitive cell 600, photo-sensitive cell 602, and photo-sensitive cell 604 are each shown to include two analog sampling circuits 601, persons skilled in the art will recognize that these circuits can be configured to instead include an arbitrary number of analog sampling circuits 601, each able to generate an independent sample. Furthermore, layout area for a typical cell is dominated by photodiode 620, and therefore adding additional analog sampling circuits 601 to a photo-sensitive cell has a relatively modest marginal impact on layout area.

In general, sample1 632 and sample2 662 may be asserted to an active state independently. In certain embodiments, sample1 632 and sample2 662 are asserted to an active state sequentially, with only one analog sampling circuit 601 sourcing current to the photodiode 620 at a time. In other embodiments, sample1 632 and sample2 662 are asserted to an active state simultaneously to generate images that are sampled substantially concurrently, but with each having a different effective exposure time.

When both sample1 632 and sample2 662 are asserted simultaneously, photodiode current I_PD will be divided between discharging node C 610 and node C 640. For example, if sample1 632 and sample2 662 are both initially asserted, then I_PD is split initially between discharging node C 610 and discharging node C 640, each at an initial discharge rate. A short time later, if sample2 662 is unasserted (set to inactive), then C 610 is discharged at a faster rate than the initial discharge rate. In such a scenario, C 640 may be used to capture a color component of a pixel within a first image having a less sensitive exposure (shorter effective exposure time), while C 610 may be used to capture a corresponding color component of a pixel within a second image having a more sensitive exposure (longer effective exposure time). While both of the above color components were exposed according to different effective and actual exposure times, both color components were also captured substantially coincidentally in time, reducing the likelihood of any content change between the first image and the second image.

In one exemplary system, three substantially identical analog sampling circuits 601 are instantiated within a photo-sensitive cell. In a first sampling interval lasting one half of a unit of time, all three analog sampling currents are configured to source current (sample signal active) into the photodiode 620, thereby splitting photodiode current I_PD substantially equally three ways. In a second sampling interval, lasting one unit of time, a first of the three analog sampling circuits 601 is configured to not continue sampling and therefore not source current into the photodiode 620. In a third sampling interval, lasting two units of time, a second of the three analog sampling circuits 601 is configured to not continue sampling and therefore not source current into the photodiode 620.

In this example, the first analog sampling circuit 601 is able to integrate one quarter of the photodiode current multiplied by time as the second analog sampling circuit 601, which was able to integrate one quarter of the photodiode current multiplied by time as the third analog sampling circuit 601. The second analog sampling circuit 601 may be associated with a proper exposure (0 EV), while the first analog sampling circuit 601 is therefore associated with a two-stop under exposure (−2 EV), and the third analog sampling circuit 601 is therefore associated with a two-stop over exposure (+2 EV). In one embodiment, digital photographic system 300 of FIG. 3C determines exposure parameters for proper exposure for a given scene, and subsequently causes the camera module 330 to sample three images based on the exposure parameters. A first image of the three images is sampled according to half an exposure time specified by the exposure parameters (−2 EV), a second image of three images is sampled according to the exposure time specified by the exposure parameters (0 EV), while a third image of three images is sampled according to twice the exposure time specified by the exposure parameters (2 EV). The first image is sampled concurrently with the second image and third image, while the second image is sample concurrently with the third image. As a consequence of concurrent sampling, content differences among the three images are significantly reduced and advantageously bounded by differences in exposure time between images, such as images comprising an image stack. By contrast, prior art systems sample images sequentially rather than concurrently, thereby introducing greater opportunities for content differences between each image.

These three exposure levels (−2, 0, +2 EV) for images comprising an image stack are suitable candidates for HDR blending techniques, including a variety of conventional and well-known techniques. In certain embodiments, conventional techniques may be implemented to determine exposure parameters, including a mid-range exposure time, for a given scene associated with a proper exposure (0 EV). Continuing the above example, the first sampling interval would implement an exposure time of half the mid-range exposure time. The second sampling interval would implement the mid-range exposure time, and the third sampling interval would implement an exposure time of twice the mid-range exposure time.

In other embodiments, the analog sampling circuits 601 are not substantially identical. For example, one of the analog sampling circuits 601 may include twice or one half the storage capacitance (such as the capacitance associated with node C 610 of FIG. 6A) of a different analog sampling circuit 601 within the same pixel. Persons skilled in the art will understand that relative sample times for each different analog sampling circuit 601 may be computed based on relative capacitance and target exposure ratios among corresponding images.

In one embodiment, image sensor 332 comprising pixels 440 fabricated to include two or more instances of analog sampling circuits 601 is configured to sample one or more ambient image and sequentially sample one or more images with strobe illumination.

Figure 6D:
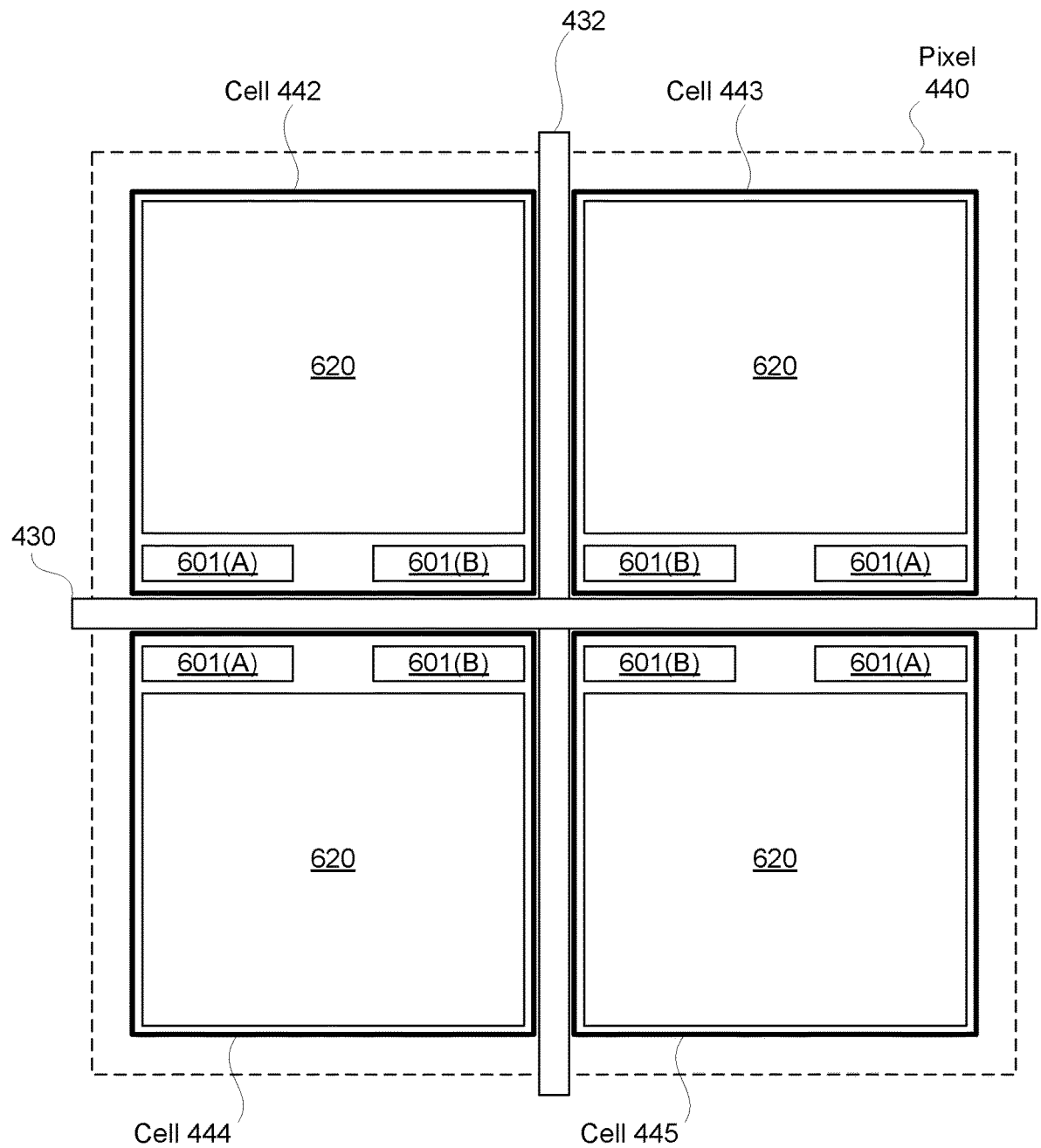
FIG. 6D depicts exemplary physical layout for a pixel comprising four photo-sensitive cells, according to one embodiment.

FIG. 6D depicts exemplary physical layout for a pixel 440 comprising four photo-sensitive cells 442, 443, 444, 445, according to one embodiment. As shown, each photo-sensitive cell 442, 443, 444, 445 includes a photodiode 620 and analog sampling circuits 601. Two analog sampling circuits 601 are shown herein, however in other embodiments, three, four, or more analog sampling circuits 601 are included in each photo-sensitive cell.

In one embodiment, column signals 432 are routed vertically between photo-sensitive cells 442 and 443, and between photo-sensitive cells 444 and 445. Row control signals 430 are shown herein as running between photo-sensitive cells 442 and 444, and between photo-sensitive cells 443 and 445. In one embodiment, layout for cells 442, 443, 444, and 445 is reflected substantially symmetrically about an area centroid of pixel 440. In other embodiments, layout for the cells 442, 443, 444, and 445 is instantiated without reflection, or with different reflection than shown here.

Figure 7A:
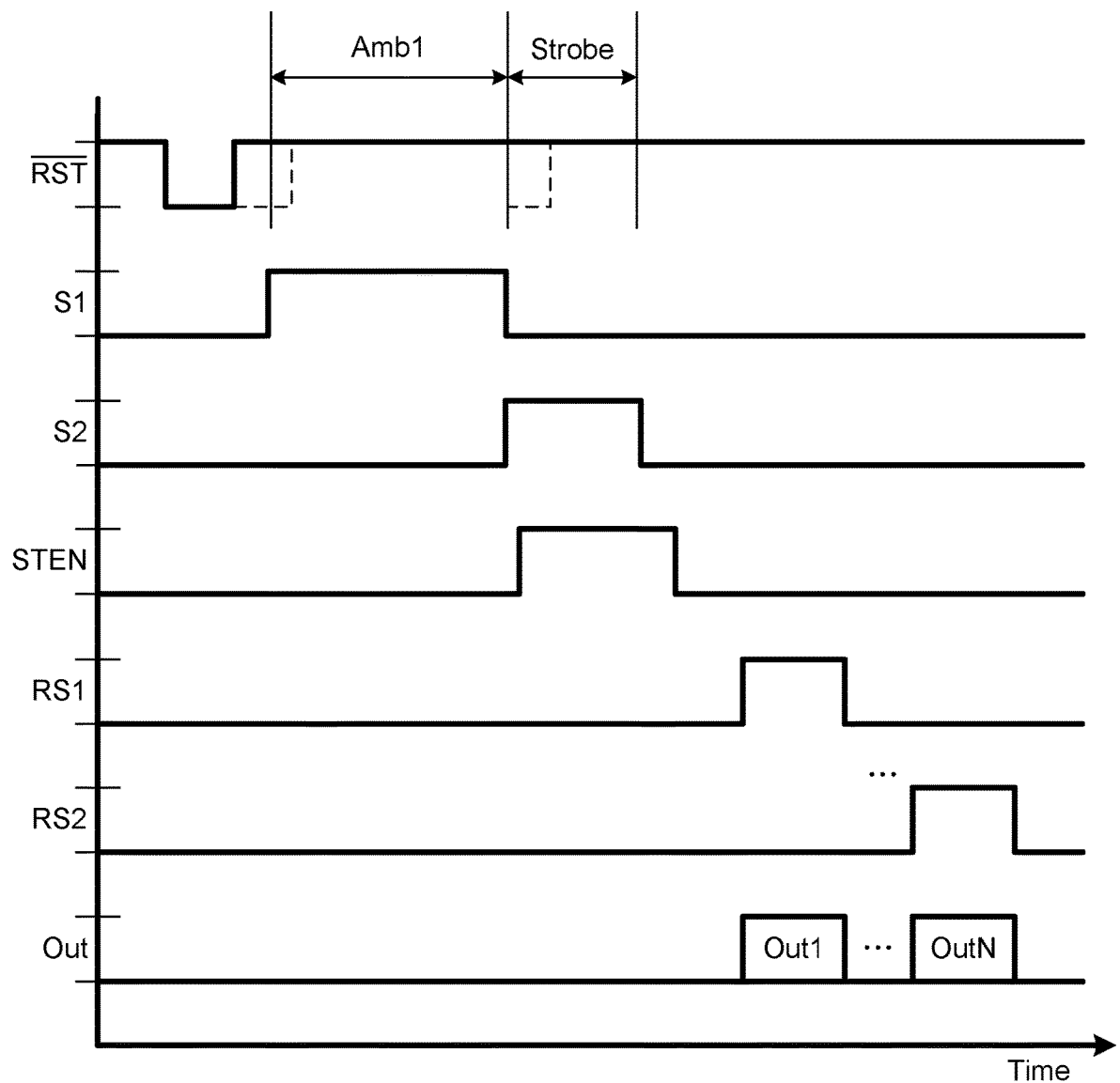
FIG. 7A illustrates exemplary timing for controlling cells within a pixel array to sequentially capture an ambient image and a strobe image illuminated by a strobe unit, according to one embodiment of the present invention.

FIG. 7A illustrates exemplary timing for controlling cells within a pixel array to sequentially capture an ambient image and a strobe image illuminated by a strobe unit, according to one embodiment of the present invention. As shown, an active-low reset signal (RST) is asserted to an active low state to initialize cells within the pixel array. Each cell may implement two or more analog sampling circuits, such as analog sampling circuit 601 of FIGS. 6A-6C, coupled to a photodiode, such as photodiode 620. In one embodiment, each cell comprises an instance of photo-sensitive cell 600. In another embodiment, each cell comprises an instance of photo-sensitive cell 602. In yet another embodiment, each cell comprises an instance of photo-sensitive cell 604. In still yet another embodiment, each cell comprises an instance of a photo-sensitive cell that includes two or more technically feasible analog sampling circuits, each configured to integrate a signal from a photodiode, store an integrated value, and drive a representation of the integrated value to a sense wire, such as a column signal, such as a column signal 432.

A first sample enable signal (S1) enables a first analog sampling circuit comprising a first analog storage plane to integrate a signal from an associated photodiode. A second sample enable signal (S2) enables a second analog sampling circuit comprising a second analog storage place to integrate the signal from the photodiode. In one embodiment, both reset1 630 and reset2 660 correspond to reset signal RST, sample1 632 corresponds to S1, and sample2 662 corresponds to S2. Furthermore, row select1 634 corresponds to RS1 and row select 664 corresponds to RS2. In certain embodiments, RST is asserted briefly during each assertion of S1 and S2 to bias the photodiode prior to sampling the photodiode current. In certain other embodiments, each photodiode is coupled to a FET that is configured to provide a reset bias signal to the photodiode independent of the RST signal. Such biasing may be implemented in FIGS. 7B through 7F.

An Out signal depicts an analog signal being driven from an analog sampling circuit 601. The Out signal may represent outA 612, outB 642, or Out 613, depending on a particular selection of analog sampling circuit 601. For example, in an embodiment that implements photo-sensitive cell 602, RS1 and RS2 are asserted mutually exclusively and the Out signal corresponds to Out 613.

A strobe enable signal (STEN) corresponds in time to when a strobe unit is enabled. In one embodiment, camera module generates STEN to correspond in time with S1 being de-asserted at the conclusion of sampling an ambient image (Amb1).

Figure 7B:
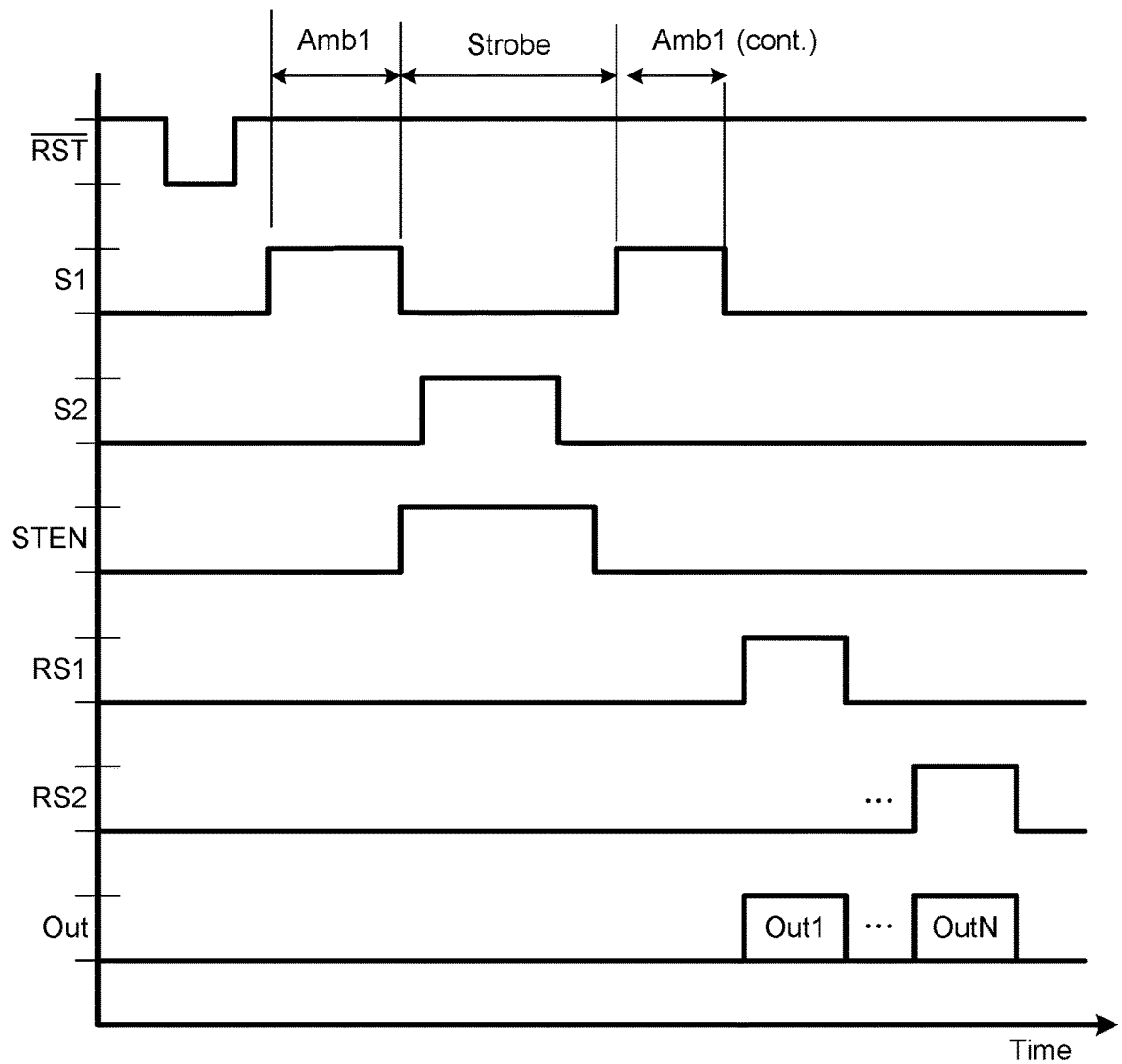
FIG. 7B illustrates exemplary timing for controlling cells within a pixel array to concurrently capture an ambient image and an image illuminated by a strobe unit, according to one embodiment of the present invention.

FIG. 7B illustrates exemplary timing for controlling cells within a pixel array to concurrently capture an ambient image and an image illuminated by a strobe unit, according to one embodiment of the present invention. As shown, the active duration of STEN is shifted in time between two different sampling intervals for the same ambient image. This technique may result in charge sharing between each analog sampling circuit and the photodiode. In this context, charge sharing would manifest as inter-signal interference between a resulting ambient image and a resulting strobe image. Removing the inter-signal interference may attenuated in the ambient image and the strobe image using any technically feasible technique.

Figure 7C:
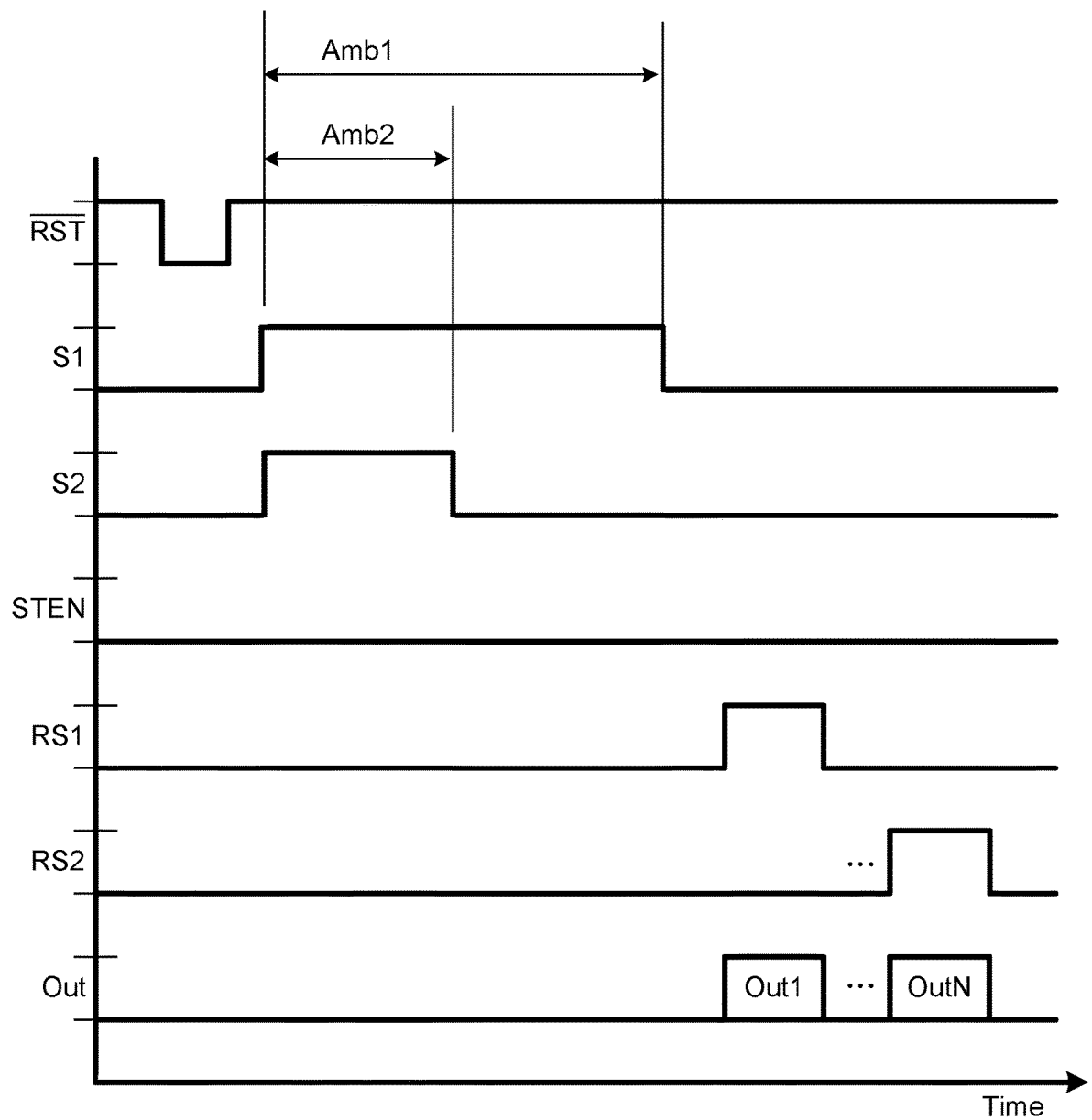
FIG. 7C illustrates exemplary timing for controlling cells within a pixel array to concurrently capture two ambient images having different exposures, according to one embodiment of the present invention.

FIG. 7C illustrates exemplary timing for controlling cells within a pixel array to concurrently capture two ambient images having different exposures, according to one embodiment of the present invention. As shown, S1 and S2 are asserted active at substantially the same time. As a consequence, sampling of the two ambient images is initiated concurrently in time. In other embodiments, the strobe unit is enabled during Amb1 and at least one of the images comprises a strobe image rather than an ambient image.

Figure 7D:
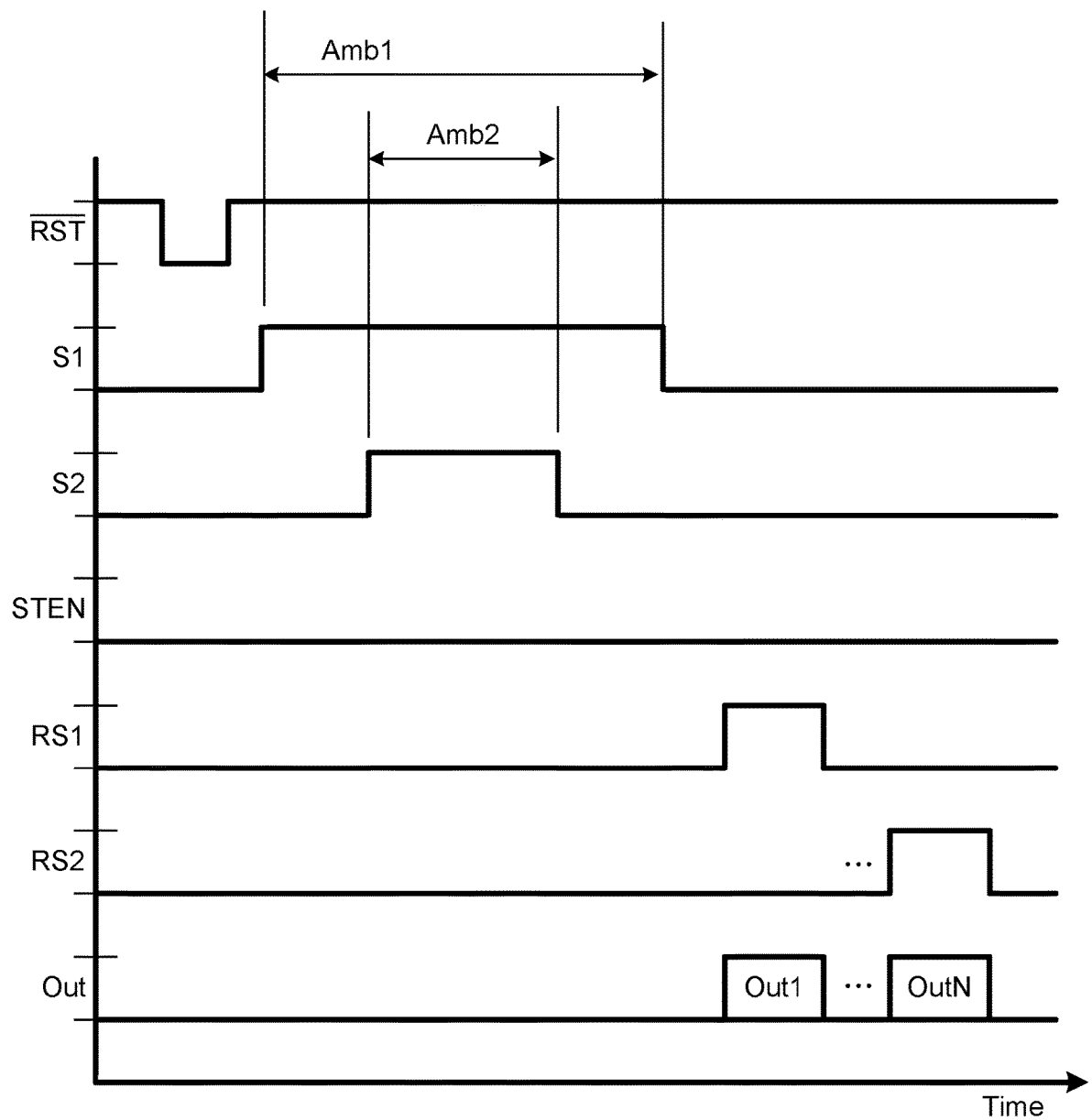
FIG. 7D illustrates exemplary timing for controlling cells within a pixel array to concurrently capture two ambient images having different exposures, according to one embodiment of the present invention.

FIG. 7D illustrates exemplary timing for controlling cells within a pixel array to concurrently capture two ambient images having different exposures, according to one embodiment of the present invention. As shown, S2 is asserted after S1, shifting the sample time of the second image to be centered with that of the first image. In certain scenarios, centering the sample time may reduce content differences between the two images.

Figure 7E:
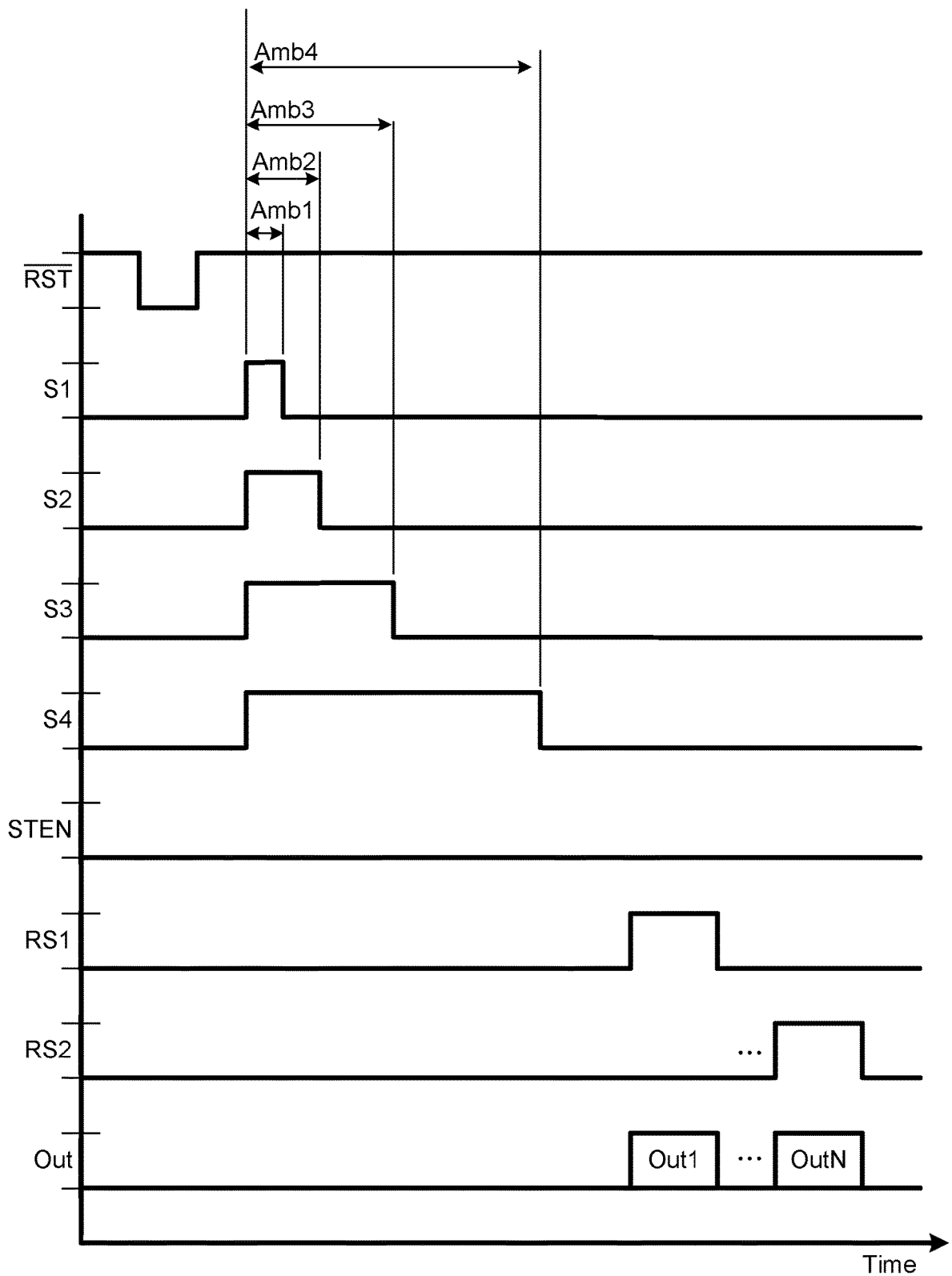
FIG. 7E illustrates exemplary timing for controlling cells within a pixel array to concurrently capture four ambient images, each having different exposure times, according to one embodiment of the present invention.

FIG. 7E illustrates exemplary timing for controlling cells within a pixel array to concurrently capture four ambient images, each having different exposure times, according to one embodiment of the present invention. Each of the four ambient images corresponds to an independent analog storage plane. In certain embodiments, a strobe unit is enabled and strobe images are captured rather than ambient images.

Figure 7F:
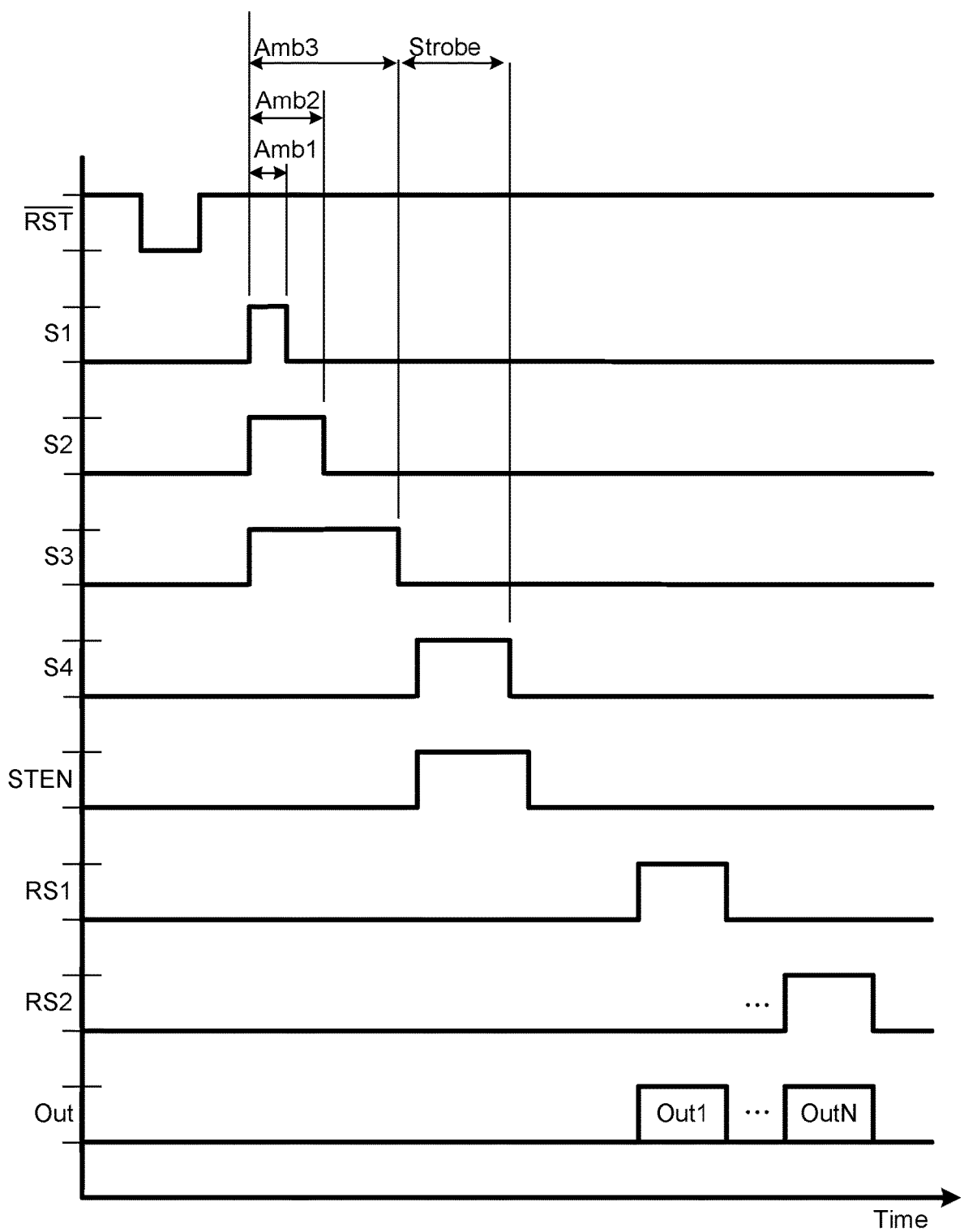
FIG. 7F illustrates exemplary timing for controlling cells within a pixel array to concurrently capture three ambient images having different exposures and subsequently capture a strobe image, according to one embodiment of the present invention.

FIG. 7F illustrates exemplary timing for controlling cells within a pixel array to concurrently capture three ambient images having different exposures and subsequently capture a strobe image, according to one embodiment of the present invention.

While row select signals (RS1, RS2) are shown in FIGS. 7A through 7F, different implementations may require different row selection configurations. Such configurations are within the scope and spirit of different embodiments of the present invention.

While various embodiments have been described above with respect to a digital camera 202 and a mobile device 204, any device configured to perform the method 100 of FIG. 1A or method 102 of FIG. 1B is within the scope and spirit of the present invention. In certain embodiments, two or more digital photographic systems implemented in respective devices are configured to sample corresponding image stacks in mutual time synchronization.

While the foregoing is directed to embodiments of the present invention, other and further embodiments of the invention may be devised without departing from the basic scope thereof, and the scope thereof is determined by the claims that follow.

We claim:

1. A camera, comprising:
circuitry configured to:
set one or more exposure parameters for an image stack;
receive a capture command;
initialize a pixel array within an image sensor of the camera;
sample a first ambient image within at least one corresponding analog storage plane, wherein the sample of the first ambient image occurs within a first duration;
sample a second ambient image within the at least one corresponding analog storage plane, wherein the sample of the second ambient image occurs within the first duration and a second duration; and
sample a first strobe image within the at least one corresponding analog storage plane, using a strobe unit, wherein the sample of the first strobe image occurs within a third duration which commences after the second duration ends.

2. The camera of claim 1, wherein the image stack comprises a third ambient image stored in a first analog storage plane of the at least one corresponding analog storage plane, and a second strobe image stored in a second analog storage plane of the at least one corresponding analog storage plane.

3. The camera of claim 1, wherein to set the one or more exposure parameters, the circuitry is configured to at least write one or more registers within the image sensor that specifies exposure time for each of the at least one corresponding analog storage plane, or write one or more registers within the image sensor that specifies exposure sensitivity for each of the at least one corresponding analog storage plane, or write one or more registers within the image sensor that specifies exposure time and exposure sensitivity for at least one of the at least one corresponding analog storage plane.

4. The camera of claim 1, wherein the camera is implemented within at least one of a digital camera, or a mobile device.

5. The camera of claim 1, wherein to initialize the pixel array, the circuitry is configured to drive voltages on internal nodes of photo-sensitive cells within the at least one corresponding analog storage plane to a reference voltage.

6. The camera of claim 1, wherein the circuitry is configured to directly enable the strobe unit.

7. The camera of claim 1, wherein the circuitry is configured to detect that the strobe unit has been enabled.

8. The camera of claim 1, wherein the camera is configured to store both the first ambient image, the second ambient image and the first strobe image concurrently within the at least one corresponding analog storage plane.

9. The camera of claim 1, wherein the camera is configured to offload at least one of the first ambient image or the second ambient image prior to sampling the first strobe image within the at least one corresponding analog storage plane.

10. The camera of claim 1, wherein the circuitry is further configured to enable simultaneous integration of a photographic scene for at least two corresponding analog storage planes.

11. The camera of claim 10, wherein two or more analog sampling circuits within the at least two corresponding analog storage planes each integrate a respective image during a sampling interval.

12. The camera of claim 1, wherein the circuitry is further configured to:
enable integration to proceed during a first sampling interval for at least two different analog storage planes;
disable integration for at least one analog storage plane of the at least two different analog storage planes; and
enable integration to proceed during a second sampling interval for at least one analog storage plane of the at least two different analog storage planes.

13. The camera of claim 12, wherein the camera is configured to transmit image data corresponding to each of the at least two different analog storage planes to a processing unit.

14. The camera of claim 13, wherein the processing unit is configured to generate the one or more exposure parameters.

15. The camera of claim 1, wherein sample the first ambient image or the second ambient image includes configuring the circuitry to:
enable integration of a first signal from an associated photodiode on a first analog sampling circuit to generate an ambient sample comprising at least one ambient image of the first ambient image or the second ambient image; and
disable integration of the first signal within the first analog sampling circuit.

16. The camera of claim 15, wherein the circuitry is further configured to reset the photodiode after disabling integration of the signal on the first analog sampling circuit.

17. The camera of claim 1, wherein sample the first strobe image includes configuring the circuitry to:
enable integration of a first signal from an associated photodiode within a first analog sampling circuit;
disable integration of the first signal on the first analog sampling circuit;
enable integration of a second signal from the associated photodiode on a second analog sampling circuit;
disable integration of the second signal on the second analog sampling circuit; and
enable integration of the first signal on the first analog sampling circuit,
wherein a strobe enable signal is asserted between two different sampling intervals for a same ambient image.

18. The camera of claim 1, wherein the first ambient image and the second ambient image are blended to form a first combined ambient image, and the first combined ambient image is blended with the first strobe image to form a first synthetic image.

19. A system, comprising:
a camera, configured to sample a photographic scene;
a processing unit, coupled to the camera, and configured to:
configure one or more exposure parameters for the image stack;
receive a capture command;
initialize a pixel array within an image sensor of the camera;
sample a first ambient image within at least one corresponding analog storage plane, wherein the sample of the first ambient image occurs within a first duration;
sample a second ambient image within the at least one corresponding analog storage plane, wherein the sample of the second ambient image occurs within the first duration and a second duration; and
sample a first strobe image within the at least one corresponding analog storage plane, using a strobe unit, wherein the sample of the first strobe image occurs within a third duration which commences after the second duration ends.

20. A method, comprising:
configuring one or more exposure parameters for an image stack;
receiving a capture command;
initializing a pixel array within an image sensor of a camera;
sampling a first ambient image within at least one corresponding analog storage plane, wherein the sample of the first ambient image occurs within a first duration;
sampling a second ambient image within the at least one corresponding analog storage plane, wherein the sample of the second ambient image occurs within the first duration and a second duration; and
sampling a first strobe image within the at least one corresponding analog storage plane, using a strobe unit, wherein the sample of the first strobe image occurs within a third duration which commences after the second duration ends.

* * * * *